US008464291B2

(12) United States Patent  (10) Patent No.: US 8,464,291 B2
Yamamoto  (45) Date of Patent: Jun. 11, 2013

(54) SYSTEM AND METHOD FOR SEARCHING AND PROVIDING CONTENTS, AND SOFTWARE STORAGE MEDIA

(75) Inventor: Tomoyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 11/499,759

(22) Filed: Aug. 7, 2006

(65) Prior Publication Data

US 2007/0006266 A1 Jan. 4, 2007

Related U.S. Application Data

(63) Continuation of application No. 10/768,841, filed on Jan. 30, 2004, which is a continuation of application No. 09/854,775, filed on May 14, 2001, now Pat. No. 6,725,215.

(30) Foreign Application Priority Data

May 15, 2000 (JP) ................................. 2000-141796

(51) Int. Cl.
*G06F 3/00* (2006.01)
*G06F 13/00* (2006.01)
*H04N 5/445* (2011.01)

(52) U.S. Cl.
USPC ................................. 725/44; 725/37; 725/38

(58) Field of Classification Search
USPC ............. 725/37, 38, 44, 45, 46, 47, 100, 131, 725/134, 141, 142, 151
See application file for complete search history.

(56) References Cited

U.S. PATENT DOCUMENTS

| 5,585,866 | A |   | 12/1996 | Miller et al. |
| 5,781,246 | A | * | 7/1998 | Alten et al. .................... 725/40 |
| 5,940,073 | A | * | 8/1999 | Klosterman et al. ......... 715/721 |
| 6,085,235 | A |   | 7/2000 | Clarke et al. |
| 6,088,722 | A |   | 7/2000 | Herz et al. |
| 6,199,076 | B1 | * | 3/2001 | Logan et al. .................. 715/203 |
| 6,351,467 | B1 |   | 2/2002 | Dillon |
| 6,408,128 | B1 |   | 6/2002 | Abecassis |
| 6,463,585 | B1 |   | 10/2002 | Hendricks et al. |
| 2002/0100044 | A1 | * | 7/2002 | Daniels ........................... 725/39 |
| 2003/0088872 | A1 | * | 5/2003 | Maissel et al. ................. 725/46 |
| 2005/0278771 | A1 | * | 12/2005 | Hassell et al. ................ 725/134 |

FOREIGN PATENT DOCUMENTS

| JP | 10-248050 | 9/1998 |
| JP | 2002-525923 | 8/2002 |
| WO | WO 00/16548 | 3/2000 |
| WO | WO-00/16548 | 3/2000 |

OTHER PUBLICATIONS

Sumiya et al., "Virtual Channel Dynamic Structuring and Continuous Queries for Data on the Air", 1997, pp. 715-720.
McManus et al., "Video-on-Demand Over ATM: Constant-Rate Transmission and Transport", Aug. 1996, pp. 1087-1098.
Japanese Office Action dated Oct. 13, 2009, for corresponding application JP 2000-141796, 2 pages.

* cited by examiner

*Primary Examiner* — John Schnurr
(74) *Attorney, Agent, or Firm* — Finnegan, Henderson, Farabow, Garrett & Dunner, L.L.P.

(57) ABSTRACT

A content searching/providing system searching a record content from a randomly accessible memory storing contents and providing the record content to a user is provided. The system comprises: a content classification unit classifying the record contents of the memory in accordance with a predetermined rule; a channel assignment unit assigning a virtual channel to each classification; a content arrangement unit arranging the record contents classified into the same classification on the corresponding virtual channels; a user operation receiving unit receiving a user operation for commanding channel selection and content search on a channel; and a content providing unit acquiring a record content from a selected virtual channel in response to the user operation received via the user operation receiving unit and providing the record content.

17 Claims, 18 Drawing Sheets

FIG. 17

| VIRTUAL CHANNEL NUMBER (VCNUM) | VIRTUAL CHANNEL NAME (VCNAME) | PROGRAM ID (PID) | PROGRAM NAME (PNAME) | START TIME (PST) | REPLAY TIME (PDUR) | FILE ID (PFID) | CHANNEL TYPE (CTYPE) |
|---|---|---|---|---|---|---|---|
| 13 | X | X1 | ---- | 6:30 | 30:00 | xfile#1 | V |
| 13 | X | X2 | ---- | 7:00 | 50:00 | xfile#2 | V |
| ---- | ---- | ---- | ---- | ---- | ---- | ---- | ---- |
| 14 | Y | Y1 | ---- | 6:00 | 1:40:00 | yfile#1 | V |
| 14 | Y | Y2 | ---- | 7:40 | 20:00 | yfile#2 | V |
| ---- | ---- | ---- | ---- | ---- | ---- | ---- | ---- |
| 15 | Q | Q1 | ---- | 7:00 | 2:00:00 | qfile#1 | A |
| 15 | Q | Q2 | ---- | 9:00 | 2:00:00 | qfile#2 | A |
| ---- | ---- | ---- | ---- | ---- | ---- | ---- | ---- |

FIG. 18

| PROGRAM ID (PID) | FILE ID (PFID) | SCENE NUMBER (PSNUM) | START POINT TIME CODE (PSTC) | END POINT TIME CODE (PETC) | IMPORTANCE | DESCRIPTION |
|---|---|---|---|---|---|---|
|  |  |  |  |  |  |  |
|  |  |  |  |  |  |  |
| ---- | ---- | ---- | ---- | ---- | ---- | ---- |

FIG. 19

| PROGRAM ID (PID) | FILE ID (PFID) | APPLICATION PROGRAM FILE ID (APFID) | DATA FILE ID (DFID) | DATA FILE ID (DFID) | DATA FILE ID (DFID) |
|---|---|---|---|---|---|
| Q1 | qfile1 | AQ | $DQ1_1$ | | |
| Q2 | qfile2 | AQ | $DQ2_1$ | $DQ2_2$ | $DQ2_3$ |
| ⋮ | ⋮ | ⋮ | ⋮ | ⋮ | ⋮ |

SYSTEM AND METHOD FOR SEARCHING AND PROVIDING CONTENTS, AND SOFTWARE STORAGE MEDIA

This is a continuation of application Ser. No. 10/768,841, filed on Jan. 30, 2004, now pending, which is a continuation of application Ser. No. 09/854,775, filed on May 14, 2001, now U.S. Pat. No. 6,725,215, issued on Apr. 20, 2004, the disclosures of which are incorporated herein by reference. U.S. patent application Ser. No. 09/854,775 claims priority to Japanese Patent Application No. 2000-141796, filed on May 15, 2000, in Japan.

BACKGROUND OF THE INVENTION

1. Field of the Invention

The present invention relates to a record content searching/providing system and method for acquiring contents recorded and/or stored in a memory apparatus. Particularly, the present invention relates to a record content searching/providing system for searching a desired picture content among a large number of recorded picture contents recorded and stored in a memory apparatus.

2. Related Art

Development of digital technology enables to store a large amount of Audio-Visual (AV) data including picture and sound without deterioration. Recently, a hard disc drive (HDD) with several tens of GB, and a memory with a larger capacity becomes available in market with less cost. And a recording apparatus using such a hard disc drive have been introduced to market (for example, see "Recording devices for recording TV programs on the HDD are introduced" (Nikkei Electronics, No. 727, pp. 27-28, 1998) or "Digital recording technology using HDD is introduced for home-use" (Nikkei Electronics, No. 727, pp. 41-46, 1998)).

The HDD is an device that allows random access to recorded data. Accordingly, unlike conventional video tape player, it is not necessary to replay a recorded program sequentially from the beginning in a recoding/replaying apparatus with the HDD to replay record contents. The HDD recording/replaying apparatus allows to start direct replaying from any points of the recorded programs. On the other hand, it may be more difficult to operate such recording/relaying apparatus for a user if he/she tries to select a particular content from a large number of programs stored in the HDD as a memory capacity of the HDD increases.

In one conventional method for assisting user selection of contents recorded in a recording/replaying apparatus such as VTR, a list containing information regarding content titles and content recording date acquired from an Electric Programming Guide (EPG) may be displayed, and then a user operation for the selection is accepted. In another conventional method, thumbnails relating contents are displayed to assist understanding of the contents. However, in these conventional method, users have to go back to an original display screen for the selection when the users wish to re-select contents, resulting cumbersome content re-selecting operations. Further, the users have to learn operations in the selection screen, becoming burden to the users.

In another conventional method, the contents are categorized beforehand to make the selection of the record contents easier. In another conventional method, the contents are categorized layer by layer. However, deeper the layer becomes, more difficult to identify a category or layer to which the content is located. On the other hand, if the less number of layers are used, a number of contents belong to the same category becomes larger whereby resulting difficulty in searching among the single category.

In another conventional method, the contents are sorted. However, the method with sorting may provide merits unless users are familiar with attributes of contents such as title or recording date by which the sorting is executed. If a number of the contents were to increase further, burden of users becomes larger.

In a conventional computer system, an application program that can handle a data file of concern is selected and activated first. The data file can be selected within an application window. Or a data file of concern can be browsed by selecting the data file on a display screen to activate a corresponding application if data files and application programs that can activate the data files are pre-registered. In both cases, the data file of concern or the corresponding application program may be selected on a display screen of Graphical User Interface (GUI) by using a coordinate indicating device such as mouse or a cursor key.

SUMMARY OF THE INVENTION

However, if such GUI operational technology commonly used in the conventional computer system were to introduced into a TV apparatus or other types of AV devices, additional devices will be required for selecting the application program or the data file, whereby resulting an increase of total device cost. Further, for users who are not familiar with operations of the computer system, it is necessary to learn totally new operations, and may deteriorate operability of the apparatus.

The content selecting operation may be viewed, in one aspect, as similar operation to channel selecting operation in a TV receiver. In a conventional TV receiver, the channel selection is made by operating up/down ($\pm$) keys and/or numeral keys of a remote controller. Further, the remote controller has additional keys separated from the channel selection keys for controlling VTR functions such as fast forward, rewind, skip forward, and skip backward. A number of keys in the remote controller may be required to increase if functions and commands of the TV receiver were to expand and a new key were to be assigned for each of the functions and commands. Further, there is a remote controller that uses a cross-shaped key to assign several functions to single key. However, such conventional cross-shaped key is not used to select channel nor to advance/retreat a replaying position.

An object of the present invention is to provide a record content searching/providing system and method that enable to acquire contents recorded and stored in a memory apparatus.

Another object of the present invention is to provide a record content searching/providing system and method that enable user-friendly content search operation from a number of contents recorded and stored in a memory apparatus.

Still another object of the present invention is to provide a record content searching/providing system and method that enable to search record contents using operations similar to operations used in a conventional TV receiver.

According to a first aspect of the present invention, a record content searching/providing system and method for searching a record content from a randomly accessible memory apparatus storing a plurality of contents, and for providing the record content to a user. The system/method comprises: content classification means/step classifying record contents of the memory apparatus in accordance with a predetermined rule; channel assignment means/step assigning a virtual channel to each classification; content arrangement means/step arranging the record contents classified into the same classification on the corresponding virtual channel; user operation receiving means/step receiving a user operation for commanding channel selection and content search on a channel; and content providing means/step acquiring a record content from a selected virtual channel in response to the user operation received via the user operation receiving means/step and providing the acquired record content.

For example, the record content may be image data of picture content such as programs broadcasted from various broadcasting stations.

The content arrangement means/step may dispose the record contents on the virtual channel along a time axis in accordance with their presentation sequence. Here, the content providing means/step may acquire the record content from a position which is moved along the time axis for a time period corresponding an operation amount of the content search operation on the virtual channel selected by the user operation receiving means/step.

The user operation receiving means/step may include a first command means/step commanding an amount of operation in a first direction and a second command means/step commanding an amount of operation in a second direction. Here, the content providing means/step specifies a virtual channel in accordance with the operation amount in the first direction by the first commanding means/step, and specifies a record content on the virtual channel in accordance with the operation amount in the second direction by the second commanding means/step.

Alternatively, the user operation receiving means may comprise a cross-shaped key. In this case, the first direction movement may be assigned to a moving key of up/down directions, and the second direction to a moving key of right/left directions. According to an example of this case, a user may conduct a content search operation intuitionally on a program schedule chart extending up/down/left/right in a two dimensional plane with using up/down/left/right cursor keys.

Further, the second commanding means/step may be configured to accept a press-in operation executed by a user. Here, the content providing means/step may acquire a record content from a position that is moved along the time axis of the Virtual channel for an amount of the press-in time executed by the second commanding means/step. For example, the content providing means/step moves a providing position within the same record content which is being presented if the press-in operating time by the second commanding means/step is less than a predetermined value (for example, scene movement/change in the recorded program which is being replayed), and moves a providing position among the record contents if the press-in operating time is not less than the predetermined value (for example, movement to another recorded program before or after).

The content searching/providing system or method according to the first aspect of the present invention may further comprise receiving means/step receiving broadcast program content that is being broadcasted from one or a plurality of broadcasting stations. In an example of this case, the user operation receiving means/step may be able to accept the channel selection operation regardless of channel types (virtual channel or real channel) by assigning real channels to broadcasting stations receivable with the channel assigning means/step. Further, the content providing means/step may provide the broadcast program content or the record content. The broadcast content is a content currently being broadcasted on the real channel that is selected in response to the user operation executed via the user operation receiving means/step. The record content is a content acquired from the virtual channel that is selected in response to the user operation executed via the user operation receiving means/step.

The user operation receiving means/step may include a set of numeral keys for specifying a channel number. In an example of this case, a part of available channels corresponding to the broadcasting stations may be assigned as the real channels. The rest of available channels that are not used for the real channels may be assigned to the virtual channels. Further in this example, the content providing means/step may acquire the content from the real channel or the virtual channel corresponding to a numeral key specified by the user operation receiving means/step.

The content classification means/step may classify or filter the record contents in accordance with user preferences or profile information. Further, the content arrangement means/step may determine the providing sequence or a priority of the record content on the virtual channel in accordance with user preferences or profile information.

The memory apparatus may store multimedia contents including multimedia data and its replay application programs in addition to the picture contents including recording data of broadcasted programs. In an example of this case, the channel assignment means/step may assign the virtual channel to each replay application program. The content arrangement means/step may dispose the multimedia data on the virtual channel to which the replay application program is assigned in accordance with sequence of replay by the replay application program. Further, the content providing means/step may activate the replay application program and replay the multimedia data in response to the selection of the multimedia data on the virtual channel to which the replay application program is assigned.

The multimedia content may comprise multimedia data, meta-data, and its replay application programs. In an example of this case, the channel assignment means/step may assign the virtual channel to each replay application program. The content arrangement means/step may dispose pairs of multimedia data and meta-data on the virtual channel to which the replay application program is assigned in sequence of replay by the replay application program. Further, the content providing means/step may activate the replay application program and replay the pairs of multimedia data and meta-data in response to the selection of the pair of multimedia data and meta-data on the virtual channel to which the replay application program is assigned.

The content providing means/step may start replaying of pre-recorded default multimedia data and meta-data without waiting further input as in a default operation mode in response to the selection of the multimedia content on the virtual channel to which the replay application program is assigned.

In general, no record is recorded on the memory apparatus when the apparatus is shipped from a factory or purchased. When a channel is selected for the first time, a screen of static state waiting for user input is displayed. Display of such screen may give odd feeling to a user who is only familiar with channel switching operations in a typical TV receiver. By providing dynamic state of content including moving pictures as default data, the user is assured of natural feeling in the channel switching operation.

The content providing means/step may re-start the content presentation from a point of time that is moved for an amount of actual time passed in the virtual channel when the virtual channel is re-selected after switching to the other channel. Or the content providing means/step may re-start the content presentation from a point of time wherein the switching to the other channel was made when the virtual channel is re-selected after switching to the other channel.

The content providing means/step may display a replay start time and/or a replaying time and/or a mark indicating a replaying position for each program of each virtual channel (see FIG. 16). A user may recognize his/her own viewing status or progress of schedule on the virtual channel visually and intuitionally.

According to a second aspect of the present invention, a software memory medium storing computer readable software described so as to control a computer system to execute a content searching/providing processing for searching a record content from a randomly accessible memory apparatus storing a plurality of contents and for providing the record content to a user, or a computer readable program for the content searching/providing processing are provided. The software (program) may comprise: content classification step classifying the record contents of said memory apparatus, in accordance with a predetermined rule; channel assignment step assigning a virtual channel to each classification; content arrangement step arranging the record contents classified into the same classification on the corresponding virtual channels; user operation receiving step receiving a user operation for commanding channel selection and content search on a channel; and content providing step acquiring a record content from a selected virtual channel in response to the user operation received in said user operation receiving step and providing the record content.

The software memory medium in accordance with the second aspect of the present invention may be a medium that provide computer software in computer readable format to a general type computer system executable of various program codes. Specifically, the medium may be a portable medium that can be inserted/removed, such as a compact disc (CD), a flexible disc (FD), a magneto-Optical disc (MO).

The software in accordance with the second aspect of the present invention may be installed into a computer system having a CPU and a memory via a software memory medium and its drive mechanism or a transmission medium such as a wired or wireless network.

The same functions and effects of the content searching/providing system or method may be realized by installing the software of the present invention and executing the installed software.

In the content searching/providing system and method in accordance with the present invention, the record contents are classified, and the virtual channel is assigned to each classification. On each virtual channel, the contents are disposed along actual or virtual time axis. Accordingly, the record content may be arrayed in a two dimensional plane where the virtual channel is scaled in vertical axis and the time is scaled in horizontal axis. In other words, arbitrary record content may be specified by addressing in two directions of up/down and left/right. Further, a user may be easily select a content from various classifications using familiar selecting channel operations used in a TV receiver by assigning cursor movement operations of up/down and left/right directions to channel selection and movement on time axis of the channel, respectively.

Further, an auto or manual program scheduling means may be provided by treating the contents belonging to the classifications as programs broadcasted on the virtual channels. In this example, replaying sequence of the programs on the virtual channels from past to future may be defined, and the contents belong to the same category may be mapped on the time axis. Accordingly, various operations such as stopping the content that is being replayed or searching beginning of content scheduled before or after the current content or starting the replay on each virtual channel by executing moving operation in the time axis direction. This may be analogous to user's selecting a program scheduled to be broadcasted past, present and future in accordance with a broadcasting schedule set by broadcasting stations while the user imagining a TV program list shown in a newspaper in his/her head. Such content searching process may be easily understandable for ordinarily TV users, and operations for the process may be easily learned.

For example, the cross-shaped key used in a conventional remote controller or a video player may be employed by assigning operations for up/down and left/right directions in the cross-shaped key to the channel selection and the movement on the time axis, respectively. In such example, a user may make the channel selection and the content selection on the virtual channel swiftly and easily by using a finger to operate the cross-shaped key while keep watching the TV screen. The content selection using the cross-shaped key may be done faster and easier comparing a case where the selection is made from a content list.

A program schedule defining replaying sequence of the contents in each classification (each virtual channel) may be automatically generated in accordance with data indicating user preference or user profile. For example, the content that a user is interested or the content of higher importance may be assigned a higher priority, and the replaying sequence of the contents may be determined accordingly. Or the contents of higher importance may be scheduled in so called golden time where higher view possibility of users is expected. Accordingly, a user may not be disappointed even if the record content is viewed as scheduled by using the present invention.

Features and effects of the present invention are well presented not only in searching particular content from the large memory apparatus but also in replaying a large number of contents that are recorded and very rare to be replayed. According to the content searching/providing system and method of the present invention, a new type of entertainment, which can not be expected from a conventional TV receiver or VTR apparatus, such as finding interesting content by accident may be provided to a user.

For example, a virtual program schedule for the virtual channels may be produced by defining a pair of meta-data and multimedia data handled by an application program as one virtual program. In such example, operations similar to the program selection operations for the virtual channel having a plurality of record contents disposed along the time axis as described above may be employed to select the meta-data or the multimedia data. Accordingly, it is not necessary for a user to learn new operational procedure to select the meta-data or the multimedia data using the active application program. Further, a user, who is not familiar with the computer or information processing technology such as the application program, the meta-data, the multimedia data, may be able to use services provided by the content searching/providing system without much trouble.

The virtual programs comprising the application program and the meta-data or the multimedia data are executed interactively, and replaying time of the virtual program is not constant in many cases. Accordingly, the virtual program schedule only specifies an order of replay presentation but not the replaying time. In such a case, the content replay may be re-started from a point of time, a state and a position of just before the channel switching when the same channel is re-selected after a certain period (or unspecified period) of time has passed since switching to the other channel. Accordingly, a user may be able to switch the channel without having much trouble, and to view various contents by switching operation.

BRIEF DESCRIPTION OF THE DRAWINGS

Other features and advantages of the present invention will be apparent from the following description taken in connection with the accompanying drawing wherein:

FIG. 10 is a flowchart indicating processing steps executed when either left or right move key of operation panel of the remote controller is pressed-in;

FIG. 11 is a flowchart indicating a part of processing steps executed when either left or right move key of operation panel of the remote controller is pressed-in;

FIG. 17 is a chart showing schematic construction of a virtual channel management table for managing record contents to be replayed or broadcasted on virtual channels;

FIG. 18 is a chart showing schematic construction of a program meta-data table for managing meta-data used for programs to be replayed or broadcasted on virtual channels; and FIG. 19 shows schematic construction of a look-up table for indicating relationships between application programs and data for virtual channels assigned for application programs.

PREFERRED EMBODIMENTS OF THE INVENTION

Details of one embodiment of the present invention are described in the following with reference to figures.

Figure 1:
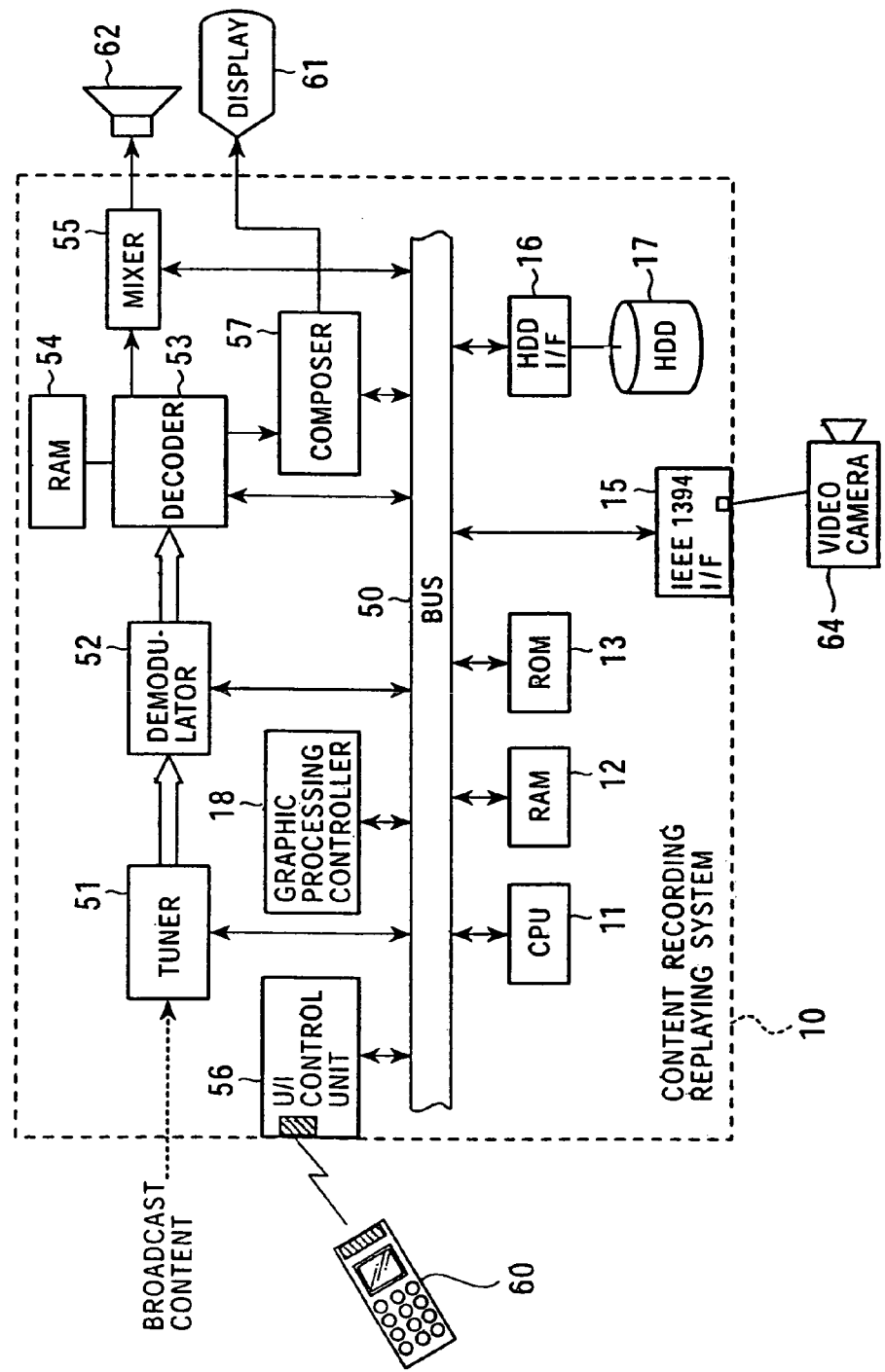
FIG. 1 is a schematic diagram indicating a hardware construction of content recording/replaying system in accordance with one embodiment of the present invention.

FIG. 1 shows a hardware construction of a content recording/replaying system 10 in accordance with one embodiment of the present invention.

The content recording/replaying system 10 of the present embodiment provides a recording function of programs (broadcast contents) broadcasted from broadcasting stations and a searching/providing function of a number of record contents for users. The content recording/replaying system 10 may be realized as a single apparatus like an audio/video apparatus, or may be constructed together with a set-top box such as a TV receiver built into a single housing.

Inside the content recording/replaying system 10, a CPU 11 functions as the main controller to interconnect hardware components through a bus 50 for controlling each component. Each section of the content recording/replaying system 10 is described in the following.

Broadcasted wave signals received at an antenna (not shown in the figure) are provided to a tuner 51. The broadcasted wave signals have predefined formats, and may include supplemental information such as an electric program guide (EPG). The broadcasted wave signals may come from ground stations or satellite stations, and may be transmitted through wireless or wired network.

The tuner 51 select a broadcast wave signal of a channel (channel selection) in accordance with instruction from the CPU 11, and sends the received data to following a demodulator 52. The demodulator 52 demodulates the received data. The broadcasted wave signal may be analog or digital modulated. The tuner 51 may be constructed depending a type of target broadcasted wave signal.

For example, when a digital satellite broadcast is to be received, the digital data received and demodulated from the broadcasted wave signal is a Transport Stream comprising multiplexed AV data compressed into a MPEG 2 format and data for broadcasting data. The AV data is visual and sound information comprising the broadcast content. The data for broadcasting data is supplemental data of the broadcast program itself, and may include the EPG. The Transport Stream conforms to specifications of a Transport Layer of Open Systems Interconnection (OSI) reference model.

A decoder 53 analyzes the Transport Stream and separate the AV data compressed into the MPEG 2 format and the data for broadcasting data. Further, the decoder 53 separates the real-time MPEG2-compressed AV data into compressed visual data and compressed sound data. The visual data is processed with a MPEG 2 expansion processing to reproduce the original visual signal (replay video signal). The sound data is decoded into a pulse code modulation (PCM) format. A replay sound signal is reproduced from the PCM decoded sound data by synthesizing with augmentative sound signals. The decoder 53 may include a memory 54 locally for storing working data. The replay video signal is displayed on a display 61 through a composer 57, and the replay sound signal is outputted from a speaker 62 through a mixer 55.

The decoder 53 transmits the data for broadcasting data separated from the Transport Stream to the CPU 11 through the bus 50. The CPU 11 may process the data for broadcasting data with an predefined application program for generating a screen image for displaying the EPG.

Further, the decoder 53 may transfers the MPEG 2 Transport Stream to the CPU 11 or the other device such as a HDD 17 via the bus 50 according to instructions of the CPU 11.

An user interface (U/I) control unit 56 is a module to process user input operations, and has a function to accept remote controls sent from a remote controller 60 for direct manual control of a user through operation buttons/switches disposed on the remote controller 60 via infrared or radio signals. The user interface control unit 56 may include a display panel and/or a LED indicators for indicating current setup conditions.

The CPU 11 is the main controller to control the total operation of the content recording/replaying system 10, and executes various application programs on a platform provided by an operating system (OS).

An random access memory (RAM) 12 is a volatile memory capable of writing data in used for loading a program code to be executed in the CPU 11 and storing working data of application programs currently being executed. An read only memory (ROM) 13 is a memory for storing self-checking and/or initializing programs to be executed at power-on of the content recording/replaying system 10 and control codes for operating hardware operations.

An IEEE1394 interface 15 is a fast speed serial interface capable of transmission and reception of data with a several 10 MBps. External devices compatible to IEEE 1394 may be connected to the IEEE 1394 port in a daisy chain connection or tree connection. The external devices compatible to IEEE 1394 may be a video camera 64 or scanner (not shown in the figure).

A hard disc drive (HDD) apparatus 17 is an external memory capable of random access and storing programs/data with predetermined file formats, and may have a large memory capacity of several ten's of GB (or more than 100 GB). In the present invention, the external memory apparatus with a large memory capacity may not necessarily be the hard disc drive, but the memory is preferred to be fast speed and randomly accessible.

The CPU 11 issues instructions to recode contents or instructions to replay the recorded contents in response to user commands sent via the remote controller 60 or the U/I control unit 56. Alternatively, the CPU 11 may issue instructions for constant recording independent of direct user commands.

During the recording, the MPEG 2 Stream before the expansion processing is transferred from the decoder 53 to the HDD 17. In the present invention, the data transfer method may not be limited to any particular ones, and may be used various methods such as a program IO (PIO) transfer method, a direct memory access (DMA) transfer method. The HDD 17 stores broadcast contents recorded in time serial manner (for example, in accordance with starting order of the replay processing) for each virtual channel. A method for storing the contents is described in the following.

During the replaying, the MPEG 2 Stream acquired from the HDD 17 is transferred to the decoder 53 via the bus 50. The decoder 53 separates the MPEG 2 Stream into the compressed video data and the compressed sound data with a similar way to that of the reception processing, and the replay processing is executed by expanding the MPEG 2 Stream and regenerating the original video and sound signals.

A graphic processing controller 18 is a dedicated controller for generating a computer screen image in accordance with drawing instructions issued from the CPU 11, and may has a drawing capability corresponding to a Super Video Graphic Array (SVGA) or Extended Graphic Array (XGA). The graphic processing controller 18 enables to execute the drawing processing, for example, for displaying a GUI operation screen or a EPG screen.

The composer 57 is used to carry out a synthesizing processing to superimpose more than two screen images when the replay video image recovered by the MPEG 2 expansion processing executed by the decoder 53 and computer images generated by the graphic processing controller 18.

Figure 2:
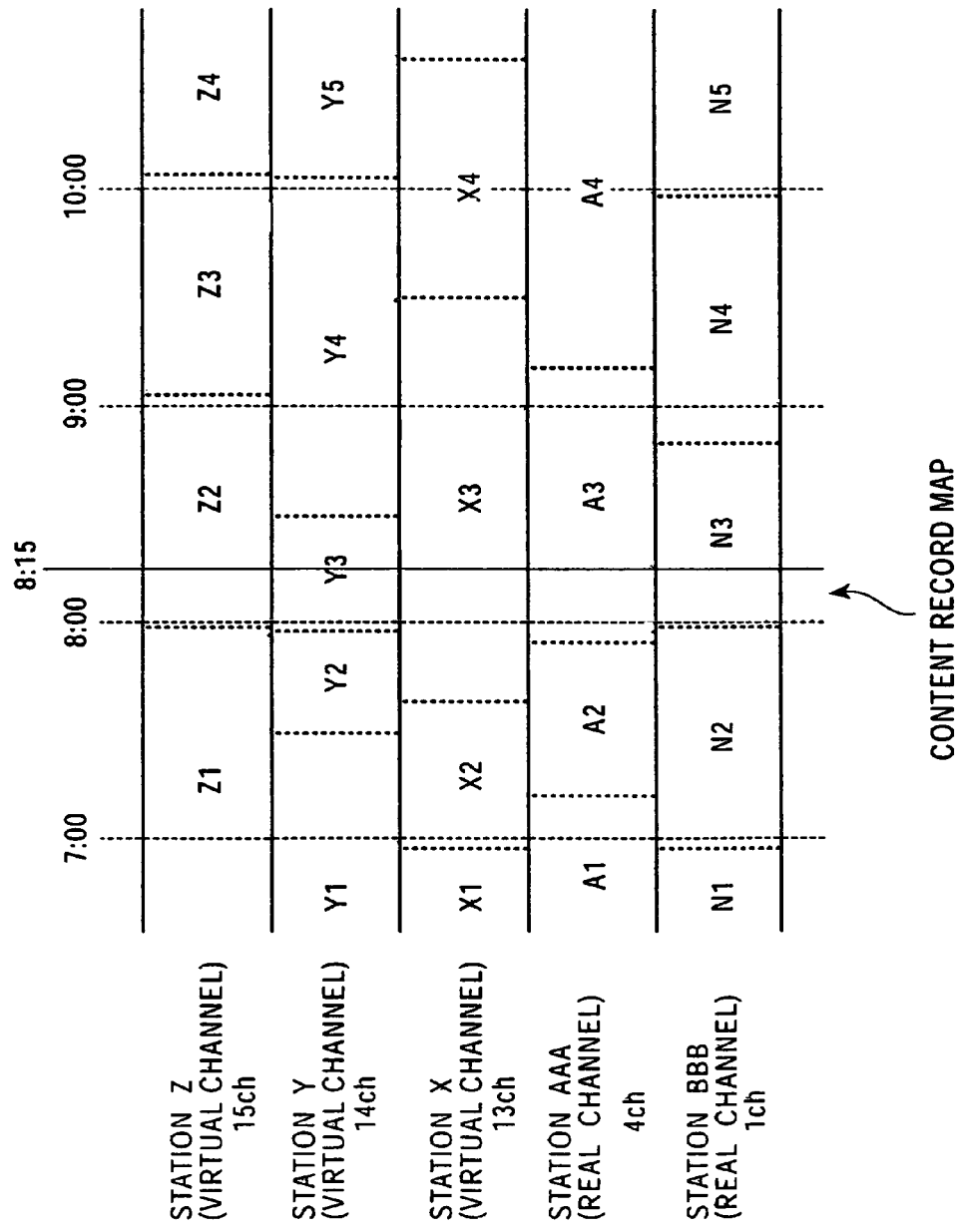
FIG. 2 is a schematic diagram showing content record map on a hard disc apparatus.

As described above, the hard disc apparatus 17 stores a number of the broadcast contents received. FIG. 2 schematically shows content record map on the hard disc apparatus 17.

On the content record map, each of the record contents is classified into one of the virtual channels, and is disposed on a real/virtual time axis at every virtual channel. In an example shown in FIG. 2, the record contents are arrayed in a kind of a program schedule chart wherein channels are disposed in vertical direction and the time axis is in the horizontal direction.

In the present embodiment, there are virtual channels assigned virtually in the content recording/replaying system 10 in addition to broadcast channels managed by actual broadcasting stations. In the example shown in FIG. 2, the lowest line of channel broadcasted by station BBB and the second lowest by station AAA are real broadcast channels, and the rest of channels of stations X, Y and Z are virtual channels virtually set up (program scheduled) by the content recording/replaying system 10.

For example, data acquired from the EPG of data broadcasting may be used to edit columns in the real broadcast channels.

Every virtual channel is assigned to one class of the content classification. The content are recorded on the corresponding virtual channel. Or the recorded content may be disposed on the corresponding channel. The contents may be classified in accordance with a default classification method predetermined or a classification method based on an user preference or other profile information.

On every channel, the contents corresponding to the channel are disposed in time series, for example, in accordance with starting order of the replay processing. It is preferable to have the time axis of real broadcast channels the same as the real time axis so as to prevent user's misunderstanding and operation mistakes. On the other hand, it is not always necessary to use the real time axis for the virtual channels. The virtual time axis may be used for the virtual channel.

For example, various program scheduling operations may be used for the virtual channels, i.e. for levels of the classifications. Such program scheduling operations may include sorting of the record contents in accordance with its importance or user's interest, or concentrating the record contents, that are of higher importance or popularity, during a golden time wherein a higher possibility of user viewing is expected. As a result of such program schedule processing, the time axis of the virtual channel may be virtual and different from the actual broadcasting schedule the time axis Details of the program schedule processing is described in the following.

The record content may be arbitrary specified by addressing positions in two directions, up/down and left/right since the record contents are assigned in array on a two dimensional plane of the record content map having a structure similar to a program schedule list as shown in FIG. 2.

In the present embodiment, cursor movement operations in the up/down and the left/right directions to select particular content on the content record map are assigned to a channel selection operation and operations for moving in the time axis, respectively. Accordingly, a user may select the content among any one of the classification easily by using familiar operations used in a TV receiver, i.e. by the channel selection operation.

In the present invention, a construction of the content record map shown in FIG. 2 is a logical construction, and may not necessary to be the same as physical construction on the hard disc. Data on the hard disc of the hard disc apparatus may be managed by, for example, using a File Allocation Table (FAT) 32.

Figure 3:
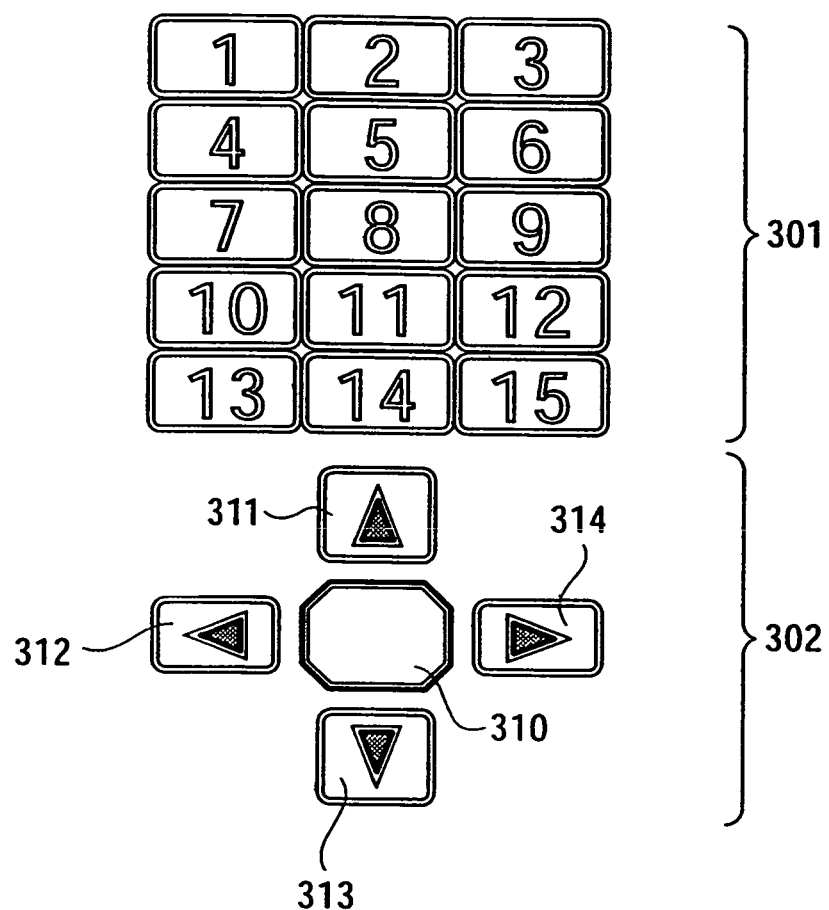
FIG. 3 is an example of user operation panel of remote controller (or U/I controller unit) applicable for one embodiment of the present invention.

FIG. 3 shows an example of a user operation panel of the remote controller 60 and/or the U/I control unit 55 in accordance with the present embodiment.

As shown in FIG. 3, a set of numeral keys 301 assigned for selecting the channels in the channel selection operation, and a set of cursor keys 302 assigned for moving a cursor along the up/down and left\right directions are disposed on the user operation panel.

The channel assigned to each numeral key may be the virtual channel comprising the contents stored in the hard disc apparatus 17 or the broadcast channel broadcasted by the actual broadcasting station. Accordingly, a user may command viewing of the virtual channel, i.e. replaying of the content from the hard disc apparatus 17 with using the same operations used in typical channel selection.

In the present embodiment, it is preferred to allocate numeral keys, that are not used for the actual broadcast channels, to the virtual channels. In the example shown in FIG. 3, fifteen numeral keys from 1-15 are provided. In the example shown in FIG. 2, channel 1 is assigned to the real broadcast station BBB and channel 4 is assigned to station AAA. Vacant channels 13, 14, 15 that are not used for the real channels, are assigned to the virtual channels X, Y, Z created by the content recording/replaying system 10 of the present embodiment.

The set of cursor keys 302 comprises an up-move key 311, a down-move key 313, a left-move key 312 and a right-move key 314 for moving a cursor in the up, down, left and right direction, respectively. These keys 311-314 are disposed around a home position 310. Accordingly, a user may easily locate a cursor key of a direction to move the cursor without staring the user operation panel (while keep watching the TV screen) by placing a finger on the home position 310.

In general, a channel number may be incremented or decremented one by one by operating a up/down (±) key disposed on a remote controller or a set-top box. For example, in the content recording/replaying system 10, a channel 13 (virtual channel X), channel 14 (virtual channel Y), channel 15 (virtual channel Z) will be sequentially selected every time an up-move (+) key is pressed when channel 12 is selected in the beginning. If the up-move key is pressed one more time, channel 1 will be re-selected.

The channel selecting operation and a fast forward/rewind operations using the user operation panel shown in FIG. 3 are described in the following for a case when the programs (contents) are scheduled as shown in FIG. 2 on the hard disc apparatus 17.

In this example, it is assumed that a program N3 is broadcasted by the actual broadcasting station BBB and a program A3 is broadcasted by the actual broadcasting station AAA at a current time of 8:15.

If the up-move key 311 is being pressed at the current time of 8:15 and when the station BBB is selected, programs N3 (1ch)→A3 (4ch)→X3 (13ch)→Y3 (14ch)→Z2 (15ch)→N3 (1ch) are sequentially received or replayed from the hard disc apparatus.

Of course it is not always necessary to use the up-move key 311 or the down-move key 313 to change the channel number sequentially. Alternatively, the numeral key 301 may be used to change the channel directly among the real channel or the virtual channel, or among discontinuous channel numbers.

For example, the virtual channel X may be directly selected and replay of the program X3 may be started by pressing the numeral key of 13 when the real channel 1 is being selected.

In the present invention, numbers of the numeral keys 301 are not limited to 1-15. Alternatively, the numeral keys may include less than 12, i.e. keys of 1-12, or more than 15 keys in accordance with embodiments of the present invention as long as: (1) the virtual channels are assigned to vacant channels that are not used for the real channels; or (2) the channel may be sequentially selected by operating the up/down (±) move keys; or (3) the channel may be directly changed to the virtual or real channel by operating the corresponding numeral keys.

Further, a key pad, that is disposed in a typical computer system and including numeral keys of 1-10 and an enter key, may also be used for specifying a number of the channel to be selection selected in the same way as the present embodiment.

In the example shown in FIG. 2, a user has no choice but passively views the broadcast contents received in time serial manner when the real channel-such as station AAA or BBB is selected at time of 8:15. On the other hand, the program (record contents) in the virtual channels X, Y, Z are recorded on the randomly accessible memory device such as the hard disc apparatus 17 whereby enabling the replay processing starting from an arbitrary storage position at an arbitrary replaying speed. Accordingly, various types of viewing such as fast forward, rewind, slow replay, scene jump, etc are possible in the virtual channel.

When the user operation panel including the up/down and left/right keys for moving the cursor in the corresponding directions as shown in FIG. 3, the cursor movement operation in the left/right direction may be assigned for the movement operation along the time axis. For example, the left-move key may be assigned to the shifting operation toward a program just before the current program in the virtual channel, and the right-move key may be assigned to the shifting operation toward a program just after the current program in the virtual channel.

For example, the program Y3 is replayed when the virtual channel Y (14ch) is selected and the current time is 8:15. If the right-move key 314 is pressed once, the current program is changed to forward to a starting point of the next program Y4. If the right-move key 314 is pressed once more, the current program is further changed to forward to a starting point of the next program Y5. Further, if the left-move key 312 is pressed once when the program Y3 is being replayed, the current program is changed to backward to a starting point of the current program Y3. If the left-move key 312 is pressed once more, the current program is further changed to forward to a starting point of the previous program Y2.

In previous example, the starting point of each program is assigned to a place to which the program is positioned when content skip operations such as the fast forward, rewinding are executed. However, the place to be positioned is not limited to the starting position of the program in the present invention. For example, a starting point of each scene may be used for the place to be positioned when the program comprises units of a scene or scenes. In this example, the left/right move keys may be used to change the scene within the same program.

Other keys or buttons besides the set of numeral keys and the set of cursor keys may be disposed on the user operation panel. For example, buttons for commanding operations such as stop, rewind, fast forward, slow replay may be disposed.

Figure 4:
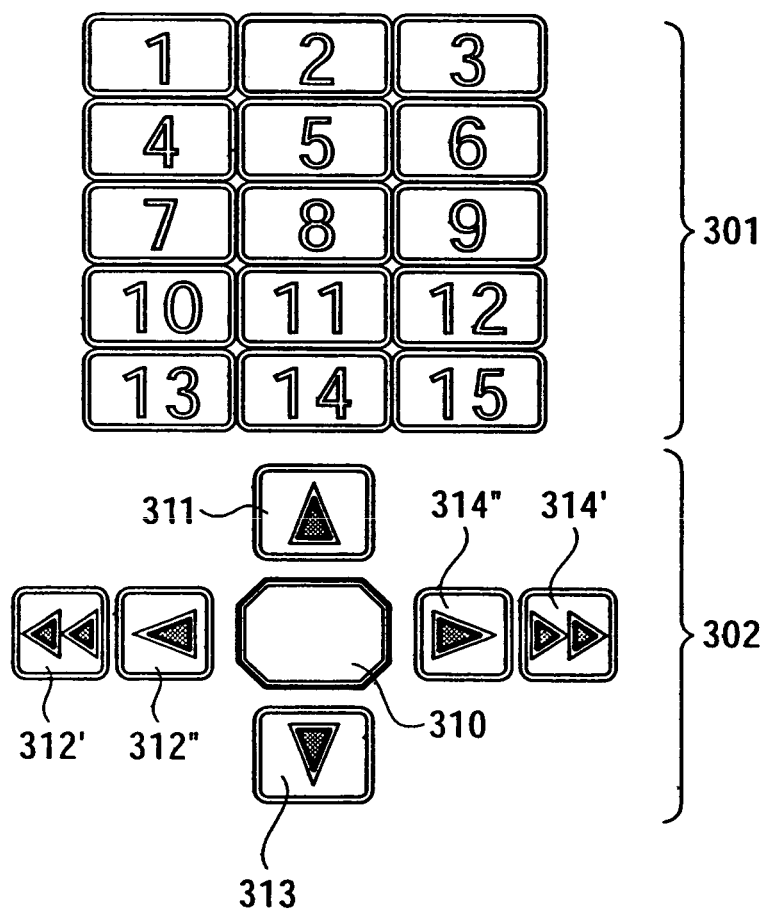
FIG. 4 is another example of user operation panel of remote controller (or U/I controller unit) applicable for one embodiment of the present invention.

FIG. 4 shows another construction example of the user operation panel disposed on the remote controller 60 (or U/I control unit 55).

In the FIG. 4, units having the same functions as that in FIG. 3 are indicated with the same numeral, and description for such units are omitted in the following.

In this example of the user operation panel, a set of cursor keys 302 include two types of move keys for each of the left and right directions. Keys 312', 314' disposed outer sides with respect to the home position 310 are assigned to a larger jump operation such as movement operation with program (content) by program (content). Keys 312', 314' disposed inner sides with respect to the home position 310 are assigned to a smaller jump operation such as movement operation with scene by scene within the same program.

Alternatively, the same cursor key construction as shown in FIG. 3 may be used except the left/right move keys is constructed so as to make a larger jump if the left/right move keys are pressed longer period of time, i.e. pressed a longer period than a predetermined time period. With this example, it is possible to expand functions of the user operation panel without increasing a number of keys whereby saving total system cost.

Scene boundaries in the program may be detected and defined manually, or may be detected automatically with utilizing image processing technique. Or data such as metadata describing scene boundary positions may be provided from a content provider such as the broadcasting station through data broadcasting or an internet. Such data may be provided with charge or without charge. Various methods to detect the scene boundary may be incorporated in the present invention. However, the present invention is not directed to the scene boundary detection method, and thus the scene boundary detection method will not be described anymore in the specification.

The processing such as fast forward, rewind, slow replay, scene jump, etc may be enabled by the random access function of the hard disc apparatus 17. However, after such processing, finish times of the programs in the corresponding virtual channel will be shifted from the times indicated in the program schedule chart (content record map) shown in FIG. 2. In such a case, it is preferred to dynamically re-schedule the program schedule for the virtual channel. For example, if the program is finished 30 minutes early, all of start times and finish times of the following programs may be set to 30 minutes earlier. When the left-move key is pressed again and replay of the present program is started, the following programs have to be re-scheduled again in accordance with a finish time of the current replaying.

A method of program scheduling will now be described.

The program scheduling method may be realized by executing a predetermined application program with the CPU 11 in the content recording/replaying system 10 in accordance with the present embodiment. There are various ways to schedule the programs. For example, the virtual channel may be related to a classification of the program. That is, the virtual channel may be set up as, for example, sports channel, news channel, variety channel, and so on, in accordance with genre information included in data provided as the EPG in the data broadcasting. The virtual channel may be automatically generated based on not only the genre information but also other information included in the EPG such as recommended information or person's name (casting in the program) while applying a predetermined rule.

Alternatively, the virtual channel may be generated by collecting programs recorded by a user. If a plurality of users are sharing the same apparatus of the content recording/replaying system 10, each virtual channel may be assigned for each user. Or single user may use the a plurality of the virtual channels to store programs recorded by the same user in the content recording/replaying system 10. In such a case, the system 10 may be constructed so as to accept user's instruction regarding which program should be stored in which virtual channel.

When the content recording/replaying system 10 stores a personal information such as user's preference and/or profile information or stores information regarding viewing tendency in the past, or information extracted from viewing tendency information using a predetermined rule is available to be used in the system 10, the system 10 can identify programs that the user may be interested based on such information. Further, the system 10 may set up a new virtual channel that can be recommended for the user by collecting those identified programs.

It is necessary to determine replaying sequence of the contents among the virtual programs when the new virtual channel is generated.

The contents, i.e. recorded programs included in one virtual channel may be sorted in accordance with a predetermined rule. The contents may be sorted in broadcasting time sequence, or an order of recommendation rating for the user preference, or an order of specific classification. In such sorting processing, past viewing history of the user may be used.

Particularly, when the order of recommendation rating is used or importance for the user is used for reference of the sorting, it is preferable to dispose the content with the highest importance at time closest to the current time of viewing. The contents with less importance may be disposed at a time position further away from the current time. The content with further less importance may be disposed at a time position before the current time (that is, in the past). According to this example of the program scheduling, a user has more chance to find a program which he/she may be interested in by shifting the time axis of the virtual channel in future direction, whereby realizing more user friendly features of the content recording/replaying system.

The content recording/replaying system 10 in accordance with one embodiment of the present invention may be applicable for recording and replaying of multimedia contents other than the contents obtained by recording the broadcasted programs. For example, an application z may be allocated to the virtual channel Z on the program schedule chart (content record map) shown in FIG. 2.

Here, the application z may be, for example, a digesting (summarizing) program for creating a digest version (summary) of the recorded program or an E-commerce application for providing an electronic business transaction service.

When the application z assigned to the virtual channel Z is the digesting program, the programs Z1, Z2, Z3, . . . may be digested versions of original programs. The digested versions of the programs may be generated with original program contents (or multimedia data) and meta data to be used for digesting processing. Here, the meta-data means "data about data" and may describe information for managing data such as attribute of data, meaning of data, place obtained, place to be stored. For example, the meta-data may describe which part of the program or multimedia data has the highest importance. The meta-data may be used for various purposes such as guidance for accessing (searching) the data or assistance for viewing the media data.

When the application z assigned to the virtual channel Z is the E-commerce application, a still image screen waiting for user's inputs may be used often. In this example, the content recording/replaying system 10 is constructed so as to activate or change the application with using user operations similar to that used in changing the TV channels. Accordingly, it is more preferable to provide moving picture image similar to TV broadcast when the channel is changed in the system 10 with using the E-commerce application and its multimedia contents. For example, picture contents such as commercial video may be replayed to display when the virtual channel with the E-commerce application is activated or selected from the other channels including the real channels and the virtual channels).

In the virtual channel to which the application is assigned and not for replaying the record content which may be obtained, for example, from the broadcasting programs, single program comprising the multimedia data and the meta-data corresponds single program in the other channel.

A digest version of program dynamically replayed from an original program video data and its meta-data in the virtual channel with the digesting application program. For example, the system 10 may be constructed so as that a user can change a replaying time of the digested version of program interactively using a dialog format. In this example of the interactive circumstance, the programs may not finished as scheduled, and it will bring no merit for a user to keep the scheduled finish time by terminating the program before it is finished.

In the present example, the program schedule for the virtual channel to which the application program is assigned defines only activation sequence of the multimedia data and the meta-data, and times mapped in the program schedule are provided for the user's convenience only.

When the program schedule of the virtual channels is visualized (for example, the content record map shown in FIG. 2 is displayed as the program schedule chart), it seems that the programs are expected to progress as scheduled. However, the programs in the virtual channel are switched when one program is finished in the present example. And the next program or the program before is selected by using the left/right move keys disposed on the user operation panel as described above.

In both the virtual channels to which replay of the record contents is assigned and the virtual channel to which the application program is assigned, the following two ways to re-start replaying in the virtual channel may be used when the virtual channel is re-selected after switching to the other channel.

(1) Start replay from a time point shifted for an amount of real time elapsed according to the program schedule of the virtual channel.

(2) Start replay from a time point when the channel was switched (i.e. a time point when the program in the virtual channel is terminated).

The content recording/replaying system 10 may be constructed so as to execute the re-start processing of (1) as a default and execute the re-start processing of (2) when instructed by a user, for example, through the user operation panel. Or, a "resume" button may be disposed on the user operation panel of the remote controller 60. In this example, the system 10 may be constructed so as to re-start replay from a time point where the program was terminated in the virtual channel when the resume button is operated.

Alternatively, a mark or tag indicating replay start point on the time axis of the virtual channel may be displayed on a display screen.

FIG. 17 is a chart showing schematic construction of a virtual channel management table for managing record contents to be replayed or broadcasted on virtual channels.

A record is provided for each program in the virtual channel management table. Each record comprises fields for storing a virtual channel number (VCNUM), a virtual channel name (VCNAME), a program identification (PID), a program name (PNAME), a program start time (PST), a program replay period (PDUR), a file identification of file including program contents, and a channel type (CTYPE). The virtual channel management table may be generated based on the EPG distributed by the data broadcasting.

It is preferable to array the records on the virtual channel management table in increasing sequence of the channel number and the program start time. For example, when specific virtual channel number (VCNUM) is selected through the user operation panel of the remote controller 60 at a given time, corresponding program identification (PID) or corresponding program name (PNAME) or corresponding record content file (PFID) may be identified by searching the virtual channel management table. If the file is identified, the record content stored in the hard disc apparatus 17 may be randomly accessed and replayed by using a conventional file system such as the FAT 32.

In the example shown in FIG. 17, the application is assigned to the virtual channel with a channel number of 15.

FIG. 18 is a chart showing schematic construction of a program meta-data table for managing meta-data used for programs to be replayed or broadcasted on virtual channels.

The meta-data may separate a program scene by scene, and describe importance and related information (e.g. appearing actors or contents) of each scene. Single record is provided for each scene of the program in the program meta-data table. Each record comprises fields for storing a program identification (PID), a file identification (PFID), scene number within the program (PSNUM), start time code of scene (PSTC) and end time code of scene, importance, detailed information (description).

A provider of broadcasting contents or applications (or providers of related services) may prepare such meta-data beforehand. Such meta-data may be provided through data broadcasting or an internet with or without charge.

FIG. 19 shows schematic construction of a look-up table for indicating relationships between application programs and data for virtual channels assigned for application programs.

Single record is provided for every program in the virtual channel to which the application program is assigned. In the example of FIG. 19, the records are provided for programs Q1, Q2, . . . to be replayed on the virtual channel with a channel number of 15. Each record comprises a plurality of fields for storing a program identification (PID), a file identification (PPID), a file identification of file including an application program to be used (APID), and a file identification of data file (multimedia data) to be used in the program (DFID). A plurality of fields may be provided for the DFID since a plurality of data files can be used in one program.

Figure 5:
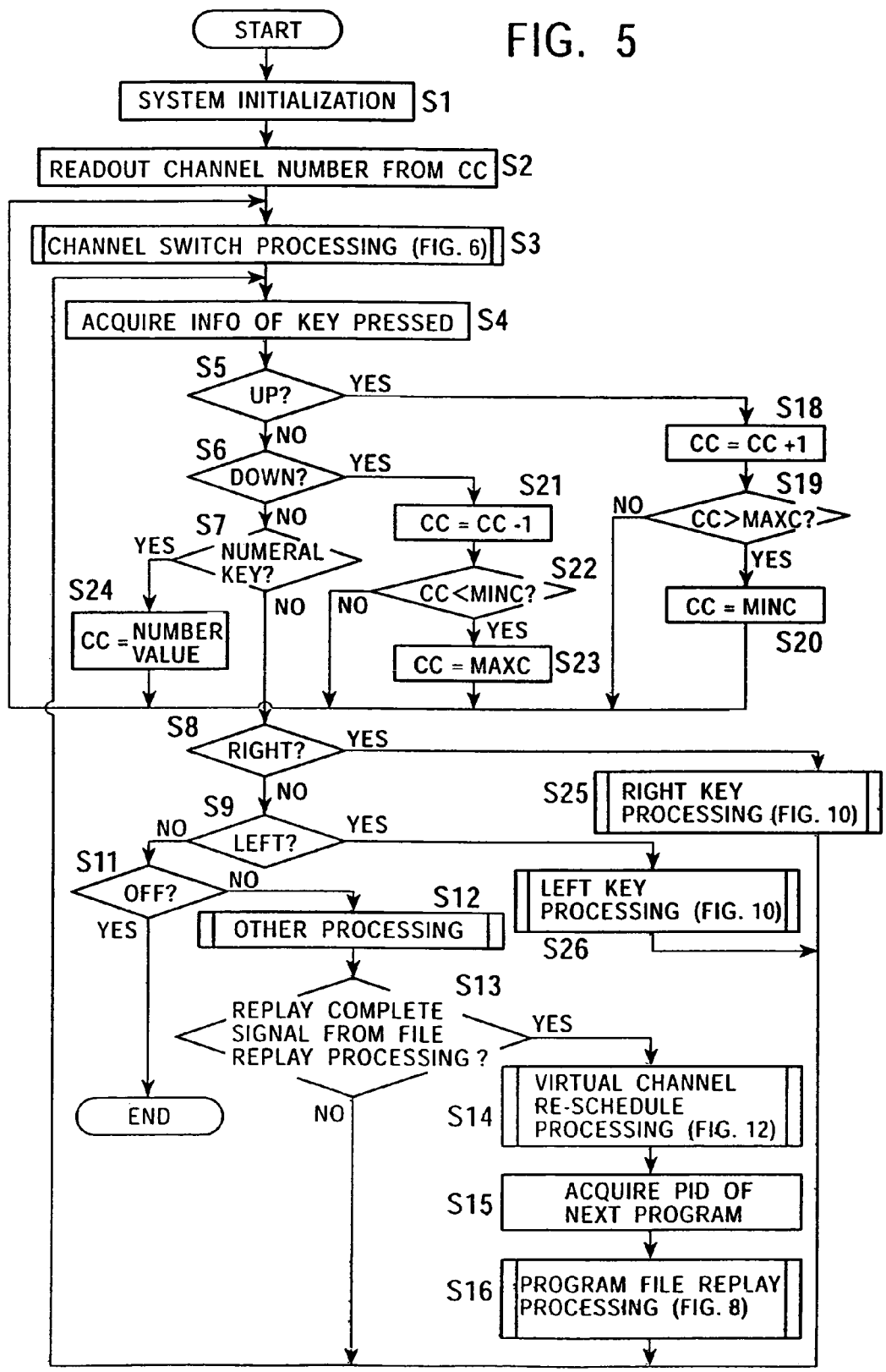
FIG. 5 is a flowchart indicating operational steps executed by a content recording/replaying system in accordance with one embodiment of the present invention.

FIG. 5 is a flowchart showing basic steps of processing executed in the content recording/replaying system 10 in accordance with one embodiment of the present invention. The basic steps are continuously executed during a power-on period after the content recording/replaying system 10 is activated and a predetermined initialization processing is executed. During execution of the basic steps, variables CC, MAXC, MINC are used for storing a channel number currently selected, a maximum value of available channel numbers, and a minimum value of available channel numbers, respectively. The basic steps of the flowchart is described in the following.

The predetermined initialization processing is executed (step S1) when the content recording/replaying system 10 is activated. Then, a current channel value is read out from CC (step S2), and a channel switch processing is executed (step S3). Detailed explanation of the channel switch processing will be made in the following with reference to FIG. 6.

A key that is pressed by a user through the user operation panel of the remote controller 60 is identified (step S4).

If the identified key is the up-move key (step S5), the current channel value CC is incremented by 1 (step S18), and check if CC reach to the maximum channel value of MAXC (step S19). If CC is more than MAXC, CC is reset to the minimum channel value of MINC (step S20).

If the identified key is the down move key (step S6), the current channel value CC is decremented by 1 (step S21), and check if CC reach to the minimum channel value of MINC (step S22). If CC is less than MINC, CC is reset to the maximum channel value of MAXC (step S23).

If the identified key is the numeral key (step S7), a number value of the numeral key is substituted to the current channel value CC (step S24).

When the renewal of the current channel value CC is completed, the processing returns to step S3 and the channel switch processing is executed.

If the identified key is the right-move key (step S8), a right key processing is executed (step S25). Similarly, if the identified key is the left-move key (step S9), a left key processing is executed (step S26). Detailed explanation of the right/left key processing will be made in the following with reference to FIGS. 10, 11.

If the identified key is a power-off key (step S11), the system 10 is turned its power off, and the instant routine of the basic steps is finished.

If the identified key is a key other than the above, a function allocated for the key is acquired, and the acquired function is realized by executing corresponding steps predetermined (step 12). These corresponding steps are not directly related to the present invention, and will not be described in this specification.

Next, it is judged if a replay complete signal is issued from a file replay processing (step S13). If the replay complete signal is not issued, the processing returns to step S4 and waits for the next key operation.

If the replay complete signal is issued, i.e. a program is finished on the virtual channel, a virtual channel re-schedule processing is executed (step S14). Detailed explanation of the virtual channel re-schedule processing will be made in the following with reference to FIG. 12.

Next, the program identification (PID) scheduled for the next to the program currently being replayed on the present channel is acquired from the virtual channel management table (FIG. 18) (step S15). Then, a program file replay processing of a program file (PFID) corresponding to the PID of the next program is executed (step S16). Detailed explanation of the program file replay processing will be made in the following with reference to FIG. 8.

Figure 6:
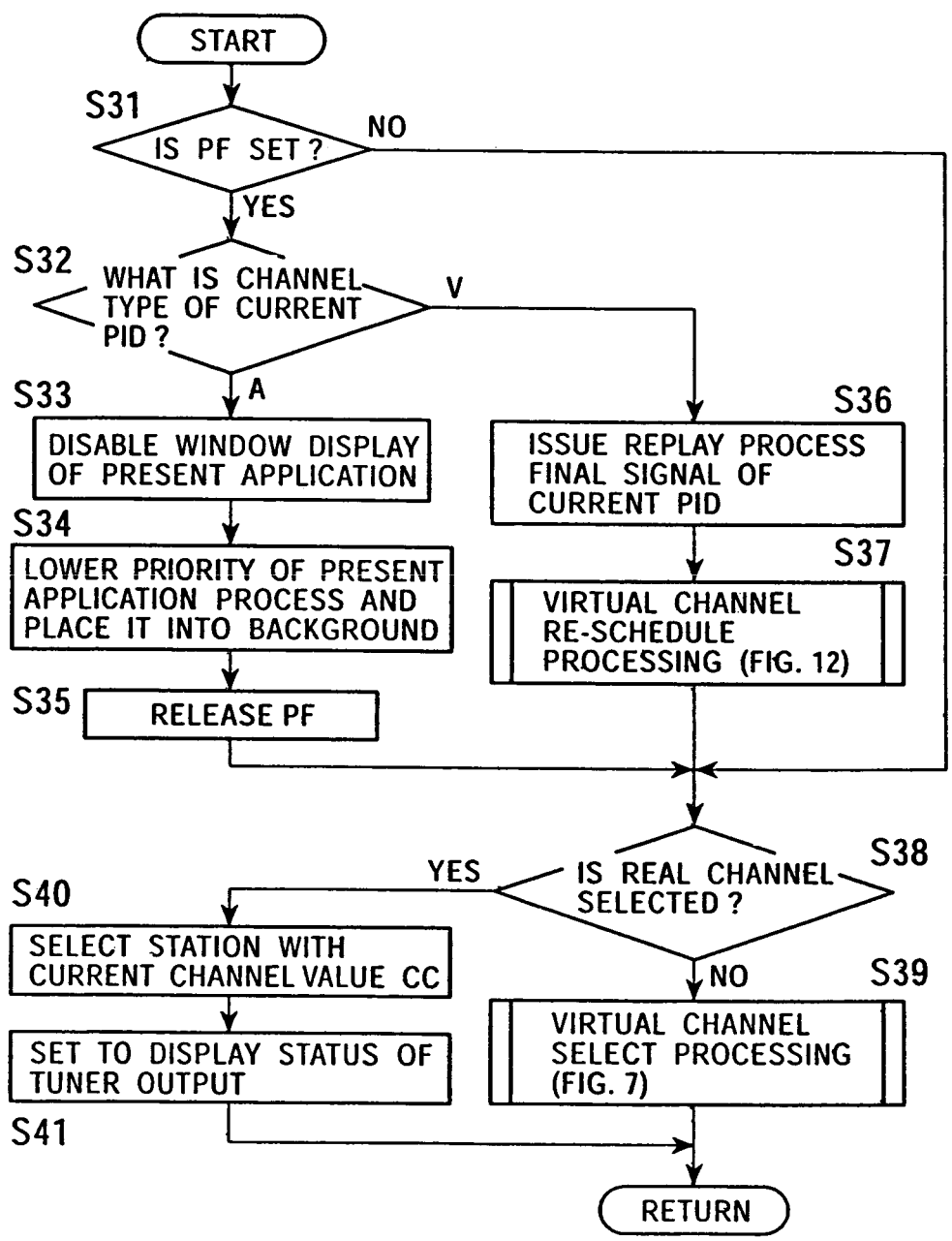
FIG. 6 is a flowchart indicating detailed steps of the channel switch processing of step S3 in the flowchart shown in FIG. 5.

FIG. 6 shows a flowchart indicating detailed steps of the channel switch processing executed in step S3 of the basic processing routine shown in FIG. 5. In the channel switch processing, a real channel selection processing or a virtual channel selection processing is executed after terminating a replay processing if the replay processing is executed in a virtual channel when the channel switch processing is called. The channel switch processing is explained in the following with reference to a flowchart of FIG. 6.

First, it is checked if a replaying flag PF is set (step S31). If the replaying flag PF is set, a channel type of a replaying program or an on-air-program on the present channel is checked (step S32). This step is realized by searching the virtual channel management table (FIG. 17) for a record of corresponding program identification (PID) to identify its channel type.

If the channel type is "A", a window display of the corresponding application is disabled (step S33), a priority order of the corresponding application processing is lowered, the corresponding application processing is set to a background (issue a background signal) (step S34), and the replaying flag PF is released (step S35).

If the channel type is "V", a replay process end signal for the program currently being replayed on the present channel is issued (step S36), and the virtual channel re-schedule processing is executed (step S37). Detailed explanation of the virtual channel re-schedule processing will be made in the following with reference to FIG. 12.

The processing moves to step S38 to check if the channel currently selected is an on-air real channel or not after PF is judged to be set in step S31, or PF is released in step S35, or the virtual channel re-schedule processing is finished in step S37.

If the real channel is selected, an channel switch instruction is issued to the tuner 51 to select a channel with the channel value of CC (step S40), and the bus 50 is set for a display state of tuner output (i.e. a state transferable of on-air broadcasting contents) (step 41). After that, the present processing is finished.

If the real channel is not selected, i.e. the virtual channel is selected, the virtual channel selection processing is executed (step S39). After that, the present processing is finished.

Figure 7:
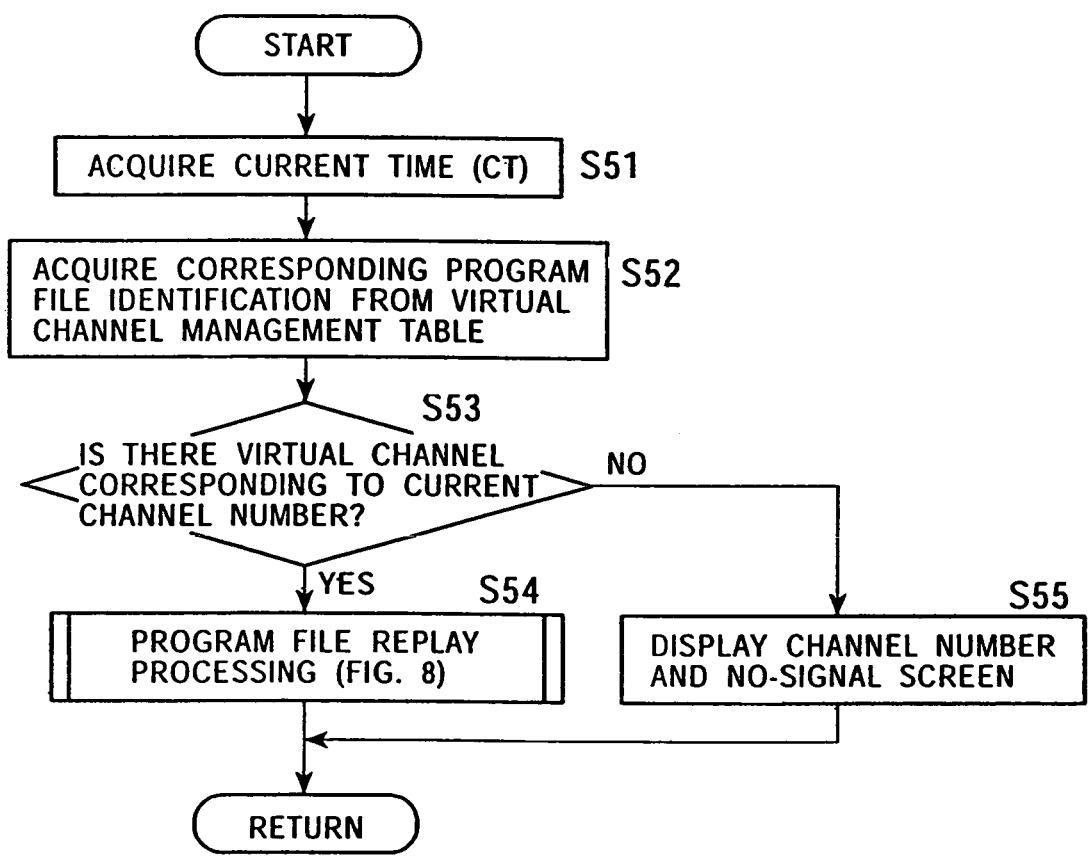
FIG. 7 is a flowchart indicating detailed steps of the virtual channel selection processing of step S39 in the flowchart shown in FIG. 6.

FIG. 7 shows a flowchart indicating detailed steps of the virtual channel selection processing. In the virtual channel selection processing, a recorded program to be replayed at the current time is identified among programs included in the present virtual channel, and the identified program is replayed. The virtual channel selection processing is explained in the following with reference to a flowchart of FIG. 7.

First, the current time (CT) is obtained from a system clock (step S51).

Next, a program file identification (PFID) corresponding to the current time (CT) and satisfying the following EQ1 is searched on the virtual channel management table (FIG. 17) (step S52).

$$VCNUM==CC \text{ and } PST \leq CT < PST+PDUR \quad (EQ1)$$

It is checked if there exist a virtual channel number VCNUM corresponding to the current channel value CC after the searching of the virtual channel management table (step S53).

If the corresponding current channel number exist, the program file replay processing is executed for a program file corresponding to the program file identification (PFID) found in step S52 (step S54). The program file replay processing is explained in the following with reference to a flowchart of FIG. 8.

If the corresponding current channel number does not exist, the selected channel number CC and a non-signal screen image are displayed (step S55). This is metaphor of a screen image which appears on a display when a channel that is not assigned to an on-air broadcasting station is selected in a conventional TV receiver.

Figure 8:
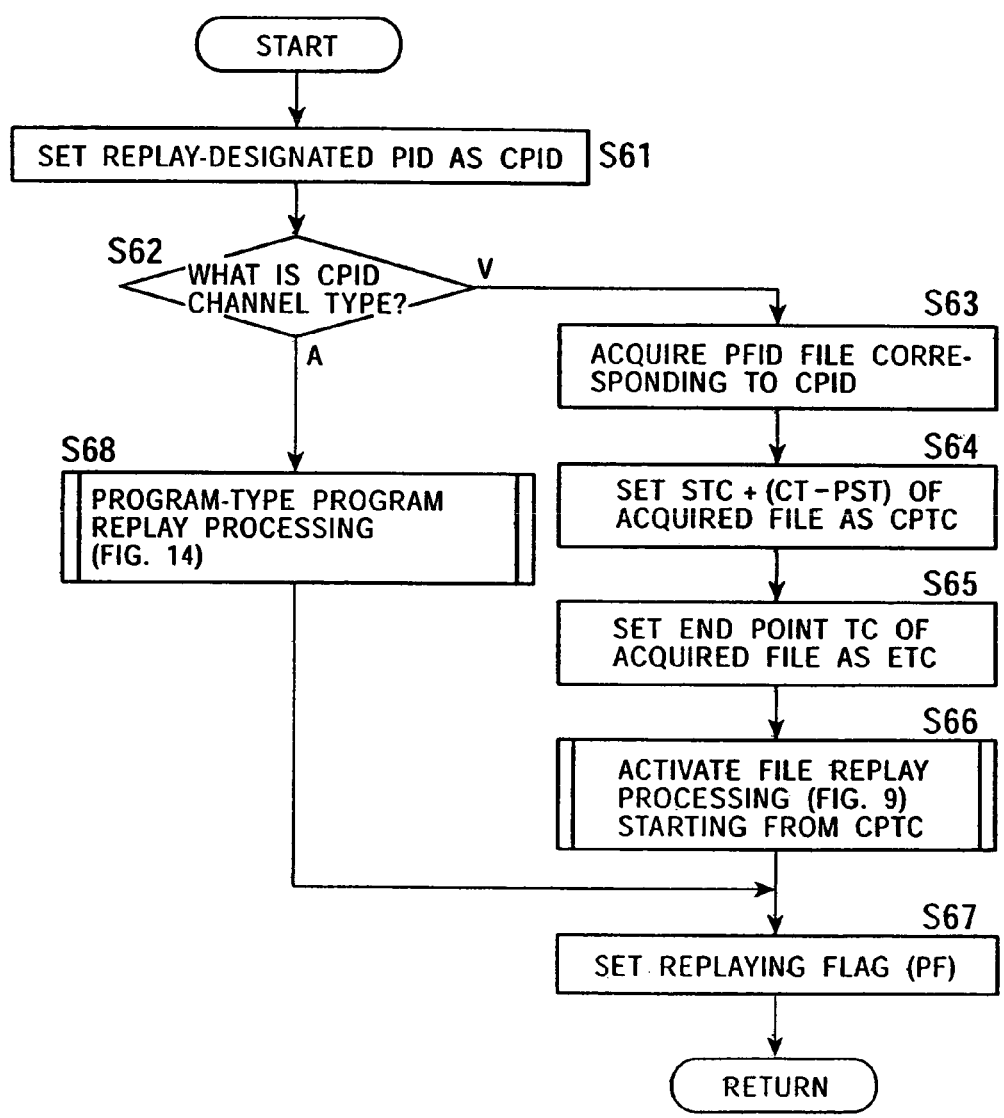
FIG. 8 is a flowchart indicating detailed steps of the program file replay processing executed in step S16 in the flowchart shown in FIG. 5 and in step S54 of the virtual channel selection processing routine shown in the flowchart of FIG. 7.

FIG. 8 shows a flowchart indicating detailed steps of the program file replay processing executed in step S16 of the basic processing routine shown in FIG. 5 and in step S54 of the virtual channel selection processing shown in FIG. 7. In the program file replay processing, a file replay processing is activated after a file replay pass is set in the content recording/ replaying system 10 by specifying the replay start point and end point (i.e. data stream read out from the hard disc apparatus 17 is output from the system 10 via the decoder 53). In the present processing routine, variables CPID, CPTC, STC, ETC and TTC are used for storing program identification of currently replaying program, time code of current replaying point, time codes of start point and end point, and time code of specified replay start point, respectively.

The program file replay processing is explained in the following with reference to a flowchart of FIG. 8.

First, the program identification PID specified to be replayed is set as the variable CPID (step S61).

Next a channel type of the specified program is checked (step S62). This checking step may be realized by referencing a record corresponding to the CPID in the virtual channel management table (FIG. 17).

If the channel type of the present channel is "A", a program file replay processing of program-type is executed (step S68). The program file replay processing of program-type is explained in the following with reference to a flowchart of FIG. 14.

If the channel type of the present channel is "V", a program file identification PFID corresponding to the CPID is obtained (step S63). This step is realized by referencing a record corresponding to the CPID in the virtual channel management table (FIG. 17).

Next, a current replay point time code CPTC is set by adding the start point time code (STC) of the present file to an offset with the current time (CT-PST) (step S64). The end point time code of the present file is set as the variable ETC (step S65).

A file replay processing is activated by using the current replay point time code CPTC as its start point. The file replay processing is explained in the following with reference to a flowchart of FIG. 9.

The replaying flag PF is set after finishing the program file replay processing of program-type in step S68 or after activating the file replay processing in step S66. After that, the present processing is finished.

Figure 9:
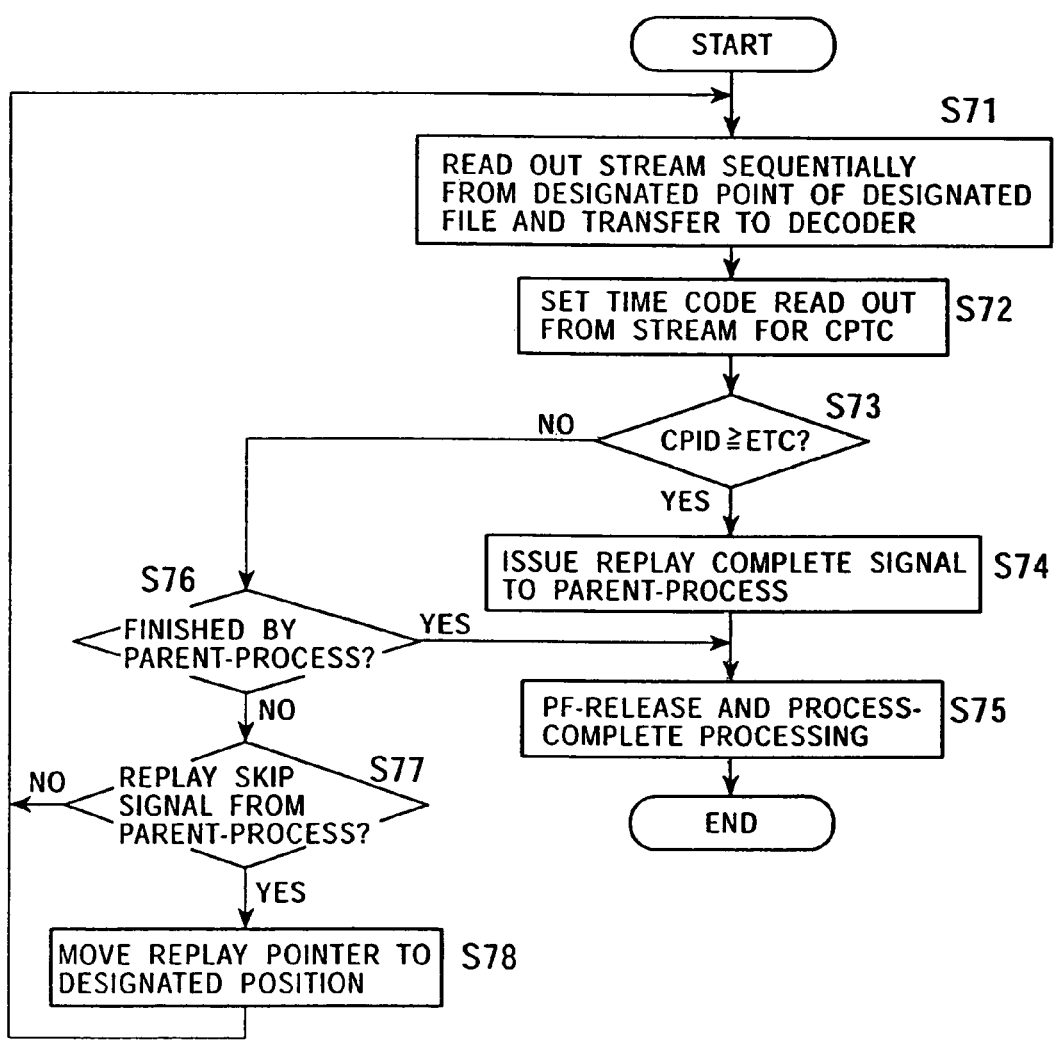
FIG. 9 is a flowchart indicating detailed steps of the file replay processing activated in step S66 in the program file replay processing routine shown in the flowchart of FIG. 8.

FIG. 9 shows a flowchart indicating detailed steps of the file replay processing activated in step S66 of the program file replay processing routine shown in FIG. 8. The file replay processing is generated as a child-process at a processing side wherein a replay instruction is issued. In the file replay processing, a data stream is read out from a point specified of the specified file, and is transferred to the replay pass set in the system 10 as described above. The file replay processing keeps time codes during the replay. Further, the file replay processing is constructed so as to be able to change the replay position in response to a request signal from the parent-process for changing the replay position.

The file replay processing is explained in the following with reference to a flowchart of FIG. 9.

The stream is sequentially read out from the specified pointer of the specified file and transferred to the decoder 53 (step S71). The time code read out from the stream is set to CPTC (step S72).

Next, the current replay point CPTC is compared with the end point time code ETC (step S73).

If the current replay point CPTC passes the ETC, the replay finish signal is issued to the parent-process (step S74). The replaying flag PF is released and a process complete processing is executed (step S75). After that, the present processing is finished.

If the current replay point CPTC has not reached the ETC, it is checked if a finish signal is issued from the parent-process (step S76).

If the finish signal is issued from the parent-process, the present processing moves to step 75 to release the replaying flag PF and execute the process complete processing. After that, the present processing is finished.

If the finish signal is not issued from the parent-process, it is further checked if a replay skip signal is issued from the parent-process (step S77).

If the replay skip signal is not issued, the present processing is returned to step S71 and repeats the same steps above until the CPTC reaches to the ETC. If the replay skip signal is issued, the replay point is shifted to a designated position TTC specified by the parent-process (step S78), and the present processing returns to step S71.

Figure 10:
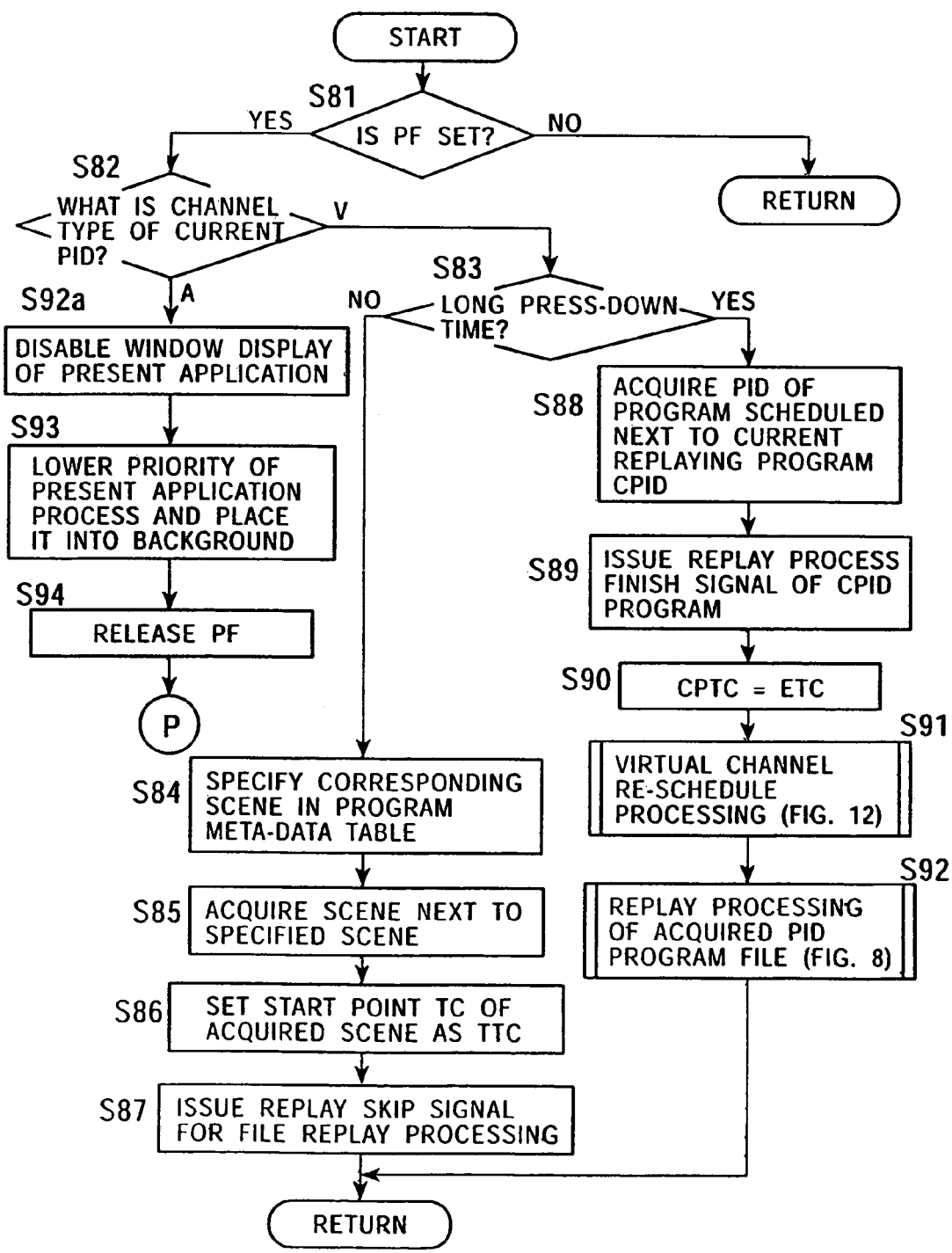
Figure 11:
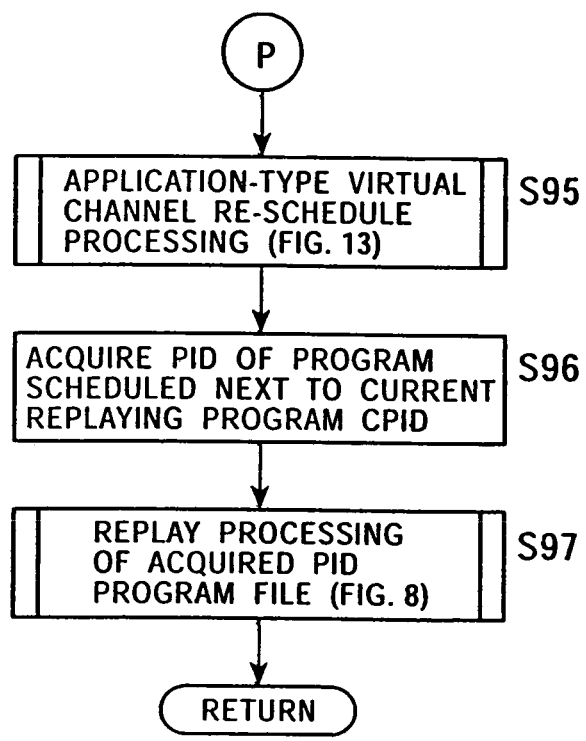

FIGS. 10, 11 show flowcharts indicating steps to be executed when the right-move key disposed on the user operation panel of the remote controller 60 is operated. These steps correspond to step 25 of the basic steps shown in FIG. 5. The system 10 is constructed so as to make a jump to a start point of scene just before (after) of the current replaying scene when the right-move key (left-move key) is pressed for a shorter period of time, and to a program scheduled to be replayed the next (previous) to the current replaying program when the key is pressed for a longer period of time. The processing is explained in the following with reference to a flowchart of FIGS. 10 and 11.

First, it is checked if the re playing flag PF is not set (step S81). If the replaying flag is not set, the pressing operation to the right-move key is neglected, and the present processing is finished.

If the replaying flag PF is set, a channel type of the on-air program or the replaying program on the present channel is checked (step S82). The step is realized by searching a record of corresponding program identification (PID) on the virtual channel management table (FIG. 17) to reference the channel type.

If the channel type is "V" a pressing operation period of the right-move key is counted (step S83).

When the pressing operation of the right-move key is less than a predetermined period, the pressing operation is judged as a skip operation to the next scene just after the present one. In this case, a corresponding scene is specified by searching the program meta-data table (FIG. 18) (step S84). The corresponding scene satisfies the following equation EQ2.

$$PID=CPID \text{ and } PSTC<CPTC \leq PETC \tag{EQ2}$$

Next, a next scene number (PSNUM+1) of the scene next to the current scene specified in step S84 which has a scene number of PSNUM (step S85). A start point TC of the next scene is set as the replay start time code TTC (step S86). The replay skip signal is issued to the file replay processing (see FIG. 9) (step S87).

When the pressing operation of the right-move key is not less than a predetermined period, the pressing operation is judged as a skip operation to the next program. In this case, a program identification (PID) of a program scheduled to be replayed after the current program with the program identification of CPID on the present channel is obtained (step S88). This step is realized by searching the virtual channel management table (FIG. 17) for a record scheduled to be started at the start time (PST) next to the record corresponding to the CPID.

Next, the replay process finish signal is issued to the file replay processing replaying the CPID (see FIG. 9) (step S89), and the ETC is substituted for the CPTC (step S90).

Next, the virtual channel re-schedule processing is executed (step S91). Detailed explanation of the virtual channel re-schedule processing will be made in the following with reference to FIG. 12.

The program file replay processing is executed for the next program of the PID obtained at step S88 (step S92). The program file replay processing was explained in the above with reference to FIG. 8.

When the channel type is judged as "A" at step S82, the present application window is disabled (step S92a), a priority of the present application is lowered to that of the background (by issuing the background signal) (step S93), and the replaying flag PF is released (step S94).

Further, the virtual channel re-schedule processing with application type is executed (step S95). Detailed explanation of the virtual channel re-schedule processing will be made in the following with reference to FIG. 13.

A program identification (PID) of a program scheduled to be replayed after the current program with the program identification of CPID on the present channel is obtained (step S96). The program file replay processing for a program with the PID is executed (step S97). The program file replay processing was explained in the above with reference to FIG. 8.

The processing steps executed when the left-move key is pressed may be realized similarly with in the steps shown in FIGS. 10 and 11 except that a program content is searched for the past by going back the schedule. Namely, in a step corresponding to step S88, a program identification PID replayed just before the current replaying program CPID. And the substituting processing executed in steps 89 and 90 is replaced with a step of setting the current replaying point CPTC as the start point time code STC.

Figure 12:
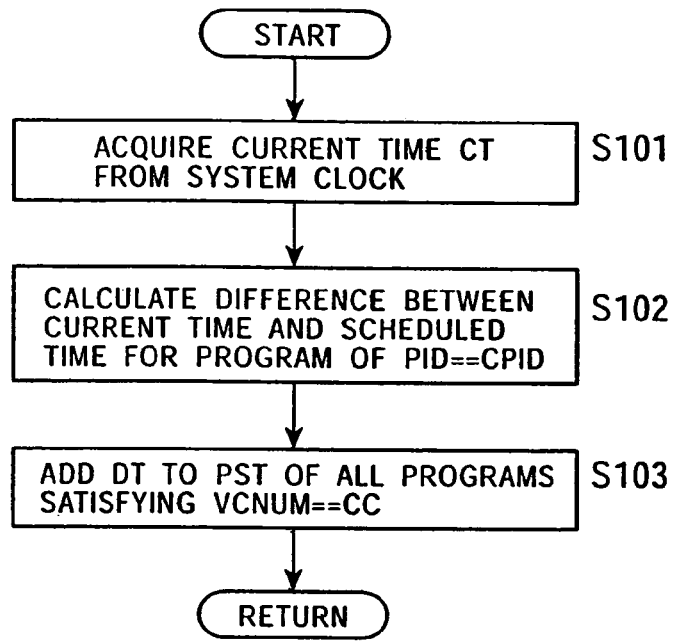
FIG. 12 is a flowchart indicating detailed steps of the virtual channel re-schedule processing.

FIG. 12 shows a flowchart indicating steps of the virtual channel re-schedule processing. The processing is executed at step 14 of the basic processing step routing shown in FIG. 5, step S37 of the channel switch processing routine shown in FIG. 6, and step S90 of the processing routine executed when the right/left move key is pressed shown in FIG. 10.

In the virtual channel re-schedule processing, the schedule of the virtual channel is redone by shifting all the scheduled times for an amount corresponding to a time difference between the actual time and the scheduled time when the present program is finished or discontinued at a time different from the scheduled finished time by operating keys such as the left/right move key, the stop key, the rewind key, the fast forward key, or the slow replaying key.

The virtual channel re-schedule processing is explained with reference to the flowchart shown in FIG. 12.

First, the current time is obtained from the system clock (step S101). A time difference DT between the current time and the scheduled time is calculated for a program of PID coinciding with the current replaying program CPID (step S102). The DT is calculated by searching a record of corresponding program on the virtual channel management table and using the following equation.

$$DT=\{(CT-PST)-(CPTC-STC)\} \qquad (EQ3)$$

Next, all program records on a virtual channel the same as that of the current replaying program (VCNUM==CC) are searched on the virtual channel management table, and the time difference DT is added to the start time PST of all the searched programs (step S103). With this step, the virtual channel re-schedule processing is completed.

Figure 13:
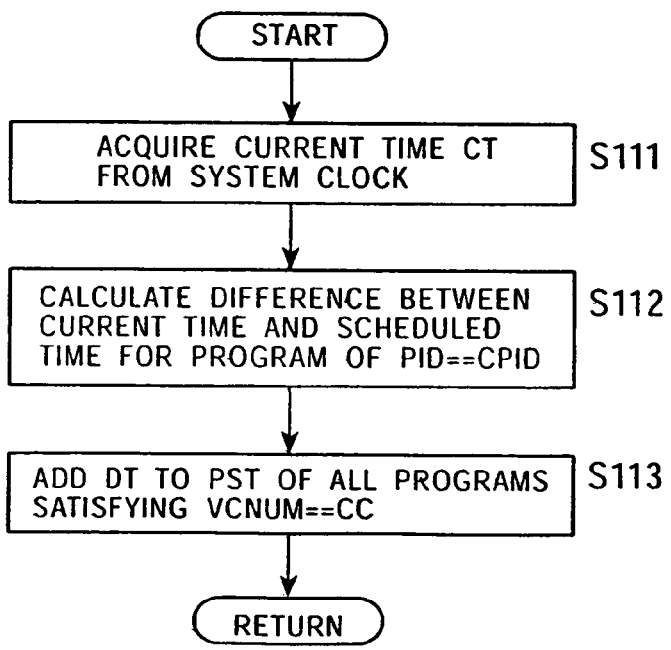
FIG. 13 is a flowchart indicating steps of the virtual channel re-schedule processing when the virtual channel is assigned to an application program.

FIG. 13 shows a flowchart indicating steps of the virtual channel re-schedule processing when the virtual channel is assigned to an application program. The processing is explained with reference to the flowchart in the following.

First, the current time is obtained from the system clock (step S111). A time difference DT between the current time and the scheduled time is calculated for a program of PID coinciding with the current replaying program CPID (step S112). The DT is calculated by searching a record of corresponding program on the virtual channel management table and using the following equation.

$$DT=\{(CT-(PST+PDUR))\} \qquad (EQ4)$$

Next, all program records on a virtual channel the same as that of the current replaying program (VCNUM==CC) are searched on the virtual channel management table, and the time difference DT is added to the start time PST of all the searched programs (step S113). With this step, the virtual channel re-schedule processing is completed.

Figure 14:
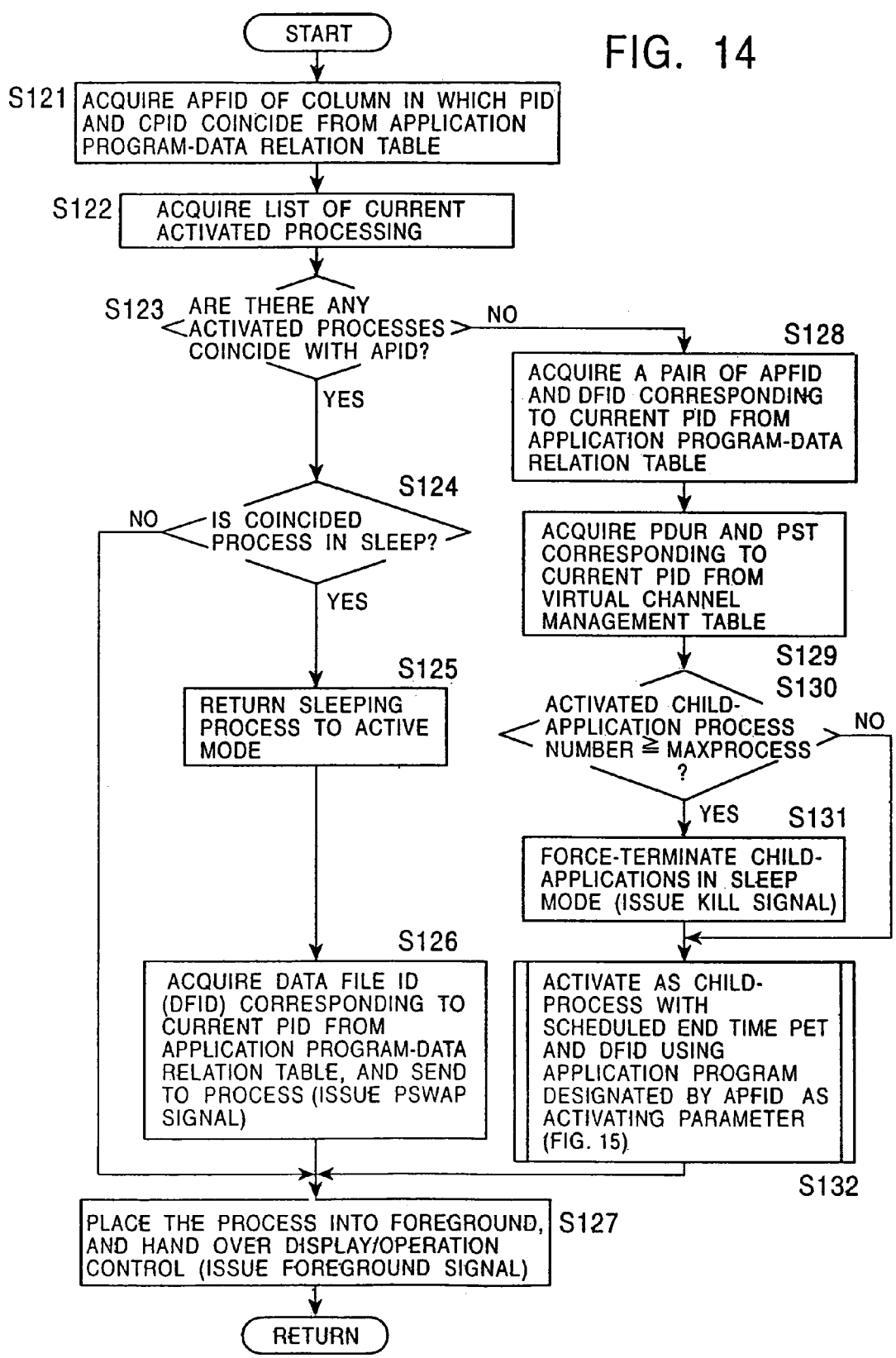
FIG. 14 is a flowchart indicating detailed steps of the program type replay processing executed in step S68 in the program file replay processing routine shown in the flowchart of FIG. 8.

FIG. 14 shows a flowchart indicating detailed steps of the program-type program replay processing. In the processing, variables CPID and MAXPROCESS are provided for storing a current replaying program identification and a maximum number of executable child-process. The processing is explained in the following with reference to the flowchart.

First, an application program file identification APFID is obtained from a record having the PID coinciding with the CPID by searching the table (see FIG. 19) indicating relationship between the application program and data (step S121).

Next, a list of activated processing is obtained, for example, from the operating system (OS) (step S122).

All of the activated processing are checked if any of the activated processing coincide with APFID obtained in step S121 (step S123).

If there is the processing coincide with the APFID, the coincided processing is further checked if it is in sleep mode (step S124).

If the processing is in the sleep mode, the processing is re-activated (step S125), a data file identification DFID corresponding to the present PID is obtained by searching the table shown in FIG. 19, and the obtained DFID is transferred to the present processing (issue a PSWAP signal) (step S126).

Next, the present processing is switched to the foreground, and controls of display and operations are transferred by issuing the foreground signal (step S127), and then the present processing is finished.

When no processing coincide with the APFID is found in step S123, the processing advanced to step S128 to obtain a pair of the APFID and DFID corresponding the present PID by searching the table shown in FIG. 19.

Further, the start time PST corresponding to the present PID and the replay time PDUR are obtained from the virtual channel management table (FIG. 17), and a scheduled end time PET (=PST+PDUR) is calculated (step S129).

Next, it is checked if a number of the activated child-application process is bigger than the maximum number of the activated child-process MAXPROCESS (step S130). If the number of the activated child-application process is equal to or bigger than the maximum number of the activated child-application process MAXPROCESS, the child-application in the sleep mode is forced to terminated (step S131). The termination of the processing is realized by issuing a "kill" signal.

Next, a child-process is activated with the DFID and the scheduled end time PET by using an application program specified by the APFID as activating parameter (step S132). Detailed steps of the process activate processing will be described with reference to FIG. 15.

The present processing is switched to the foreground, and controls of display and operations are transferred by issuing the foreground signal (step S127), and then the present processing is finished.

Figure 15:
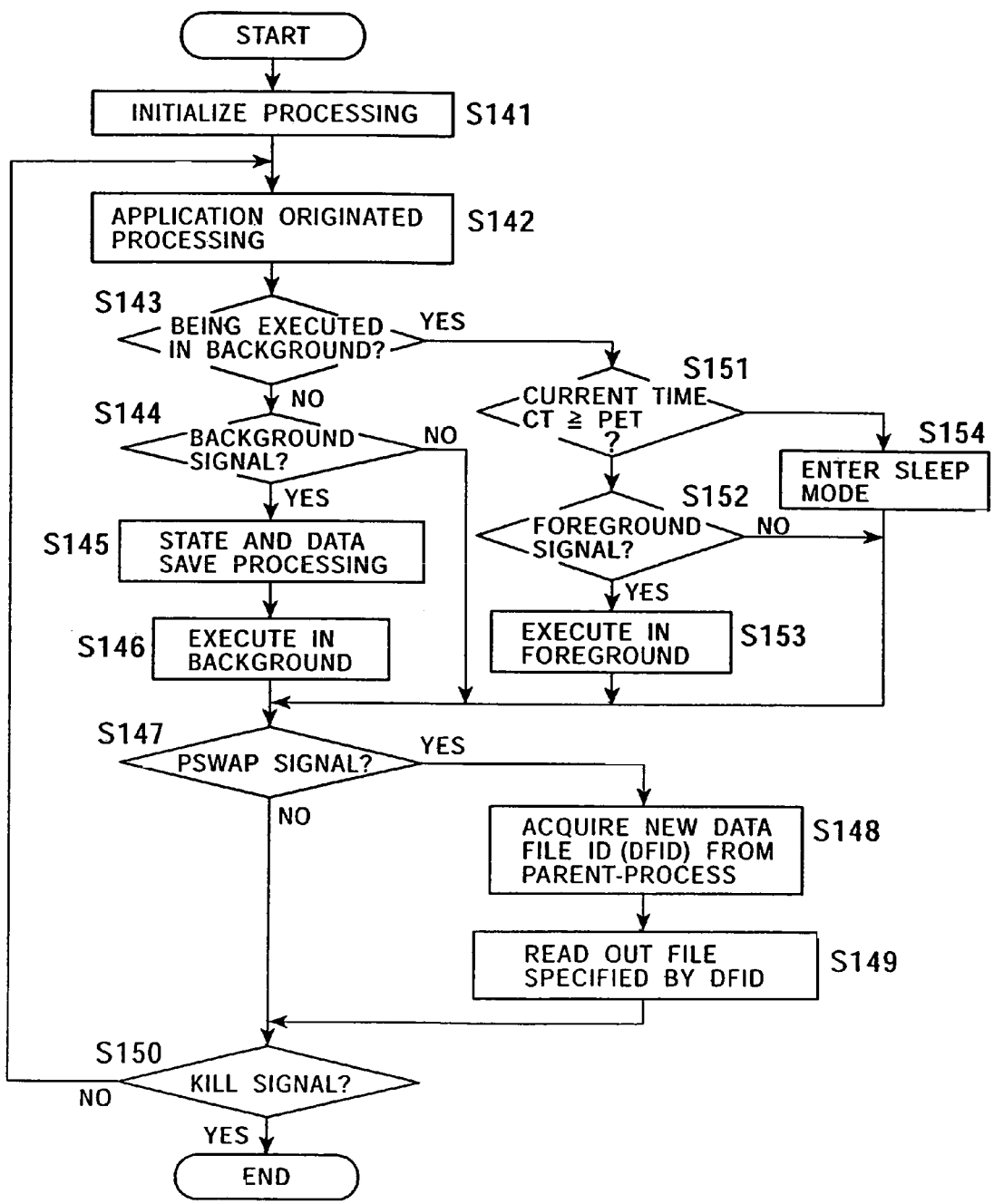
FIG. 15 is a flowchart indicating detailed steps of the application processing.

FIG. 15 shows a flowchart indicating steps of the application process activate processing executed in step S132 of the program-type program replay processing routine shown in FIG. 14. The processing is explained with reference to the flowchart in the following.

First, a process initialize processing such as reading in of a file designated by the DFID (step S141).

Next, the original processing steps of an application processing specified by the APFID are executed (step S142). The steps include, for example, an input step.

Next, it is checked if the present application processing is executed in the background (step S143).

If the application processing is not executed in the background, it is further checked if the background signal is received (step S144). When the background signal is received, status and data save processing is executed (step S145) to switch to a background execution mode (step S146).

If the application processing is judged to be executed in the background, it is further checked if the current time CT is equal to or larger than the scheduled end time PET (step S151). When the current time CT is equal to or larger than the scheduled end time PET, the present processing is transferred to the sleep mode (step S154). When the current-time CT is less than the scheduled end time PET, it is further checked if the foreground signal is received (step S152). IF the foreground signal is received, the processing is transferred to the foreground execution (step S153).

In step S147, it is checked if the PSWAP signal is issued or not. If the signal is issued, a new data file identification (DFID) is obtained from the parent-process (step S148), and a file specified by the DFID is read out (step S149).

In step S150, it is checked if the kill signal to compulsory terminate the processing is issued. When the kill signal is not issued, the processing is returned to step S142 to repeat the above described steps. When the kill signal is issued, the application processing itself is finished.

In the present embodiment of the present invention, a window for displaying schedule or status of progress on the virtual channel may be superposed on the display screen 61 showing the virtual channel or the real channel.

Figure 16:
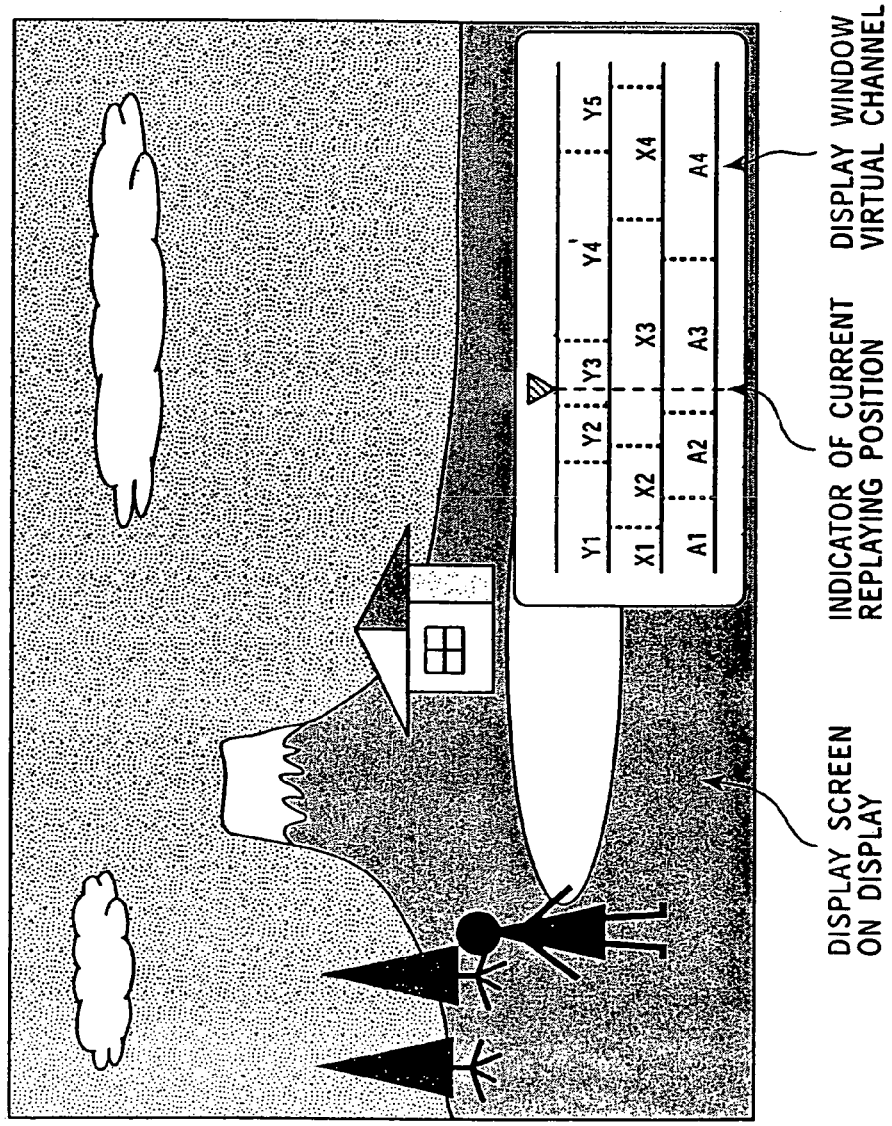
FIG. 16 is a diagram showing an example of screen image with replay start time and replaying time and/or marks showing replaying positions on time axis of the virtual channels for each programs.

FIG. 16 shows an example of display screen for the virtual channel window. In this example, a virtual channel window with a time-table format is displayed on lower left corner of the display screen so as that the user can confirm replay start times or replaying times of the channels. Further, an indicator mark indicating a current replaying position is shown in the virtual channel window. The user may recognize his/her own viewing status or progress of schedule on the virtual channel visually and intuitionally.

As described above, according to the present invention described above with the embodiments, there is provided the record content searching/providing system and method that enable to acquire contents recorded and stored in a memory apparatus.

According to the present invention described above with the embodiments, there is provided the record content searching/providing system and method that enable user-friendly content search operation from a number of contents recorded and stored in a memory apparatus.

According to the present invention described above with the embodiments, there is provided the record content searching/providing system and method that enable to search record contents using operations similar to operations used in a conventional TV receiver.

According to the record content searching/providing system and method in accordance with the present invention, picture contents and/or multimedia contents other than the picture contents may be selected only using operations similar to ones for switching channel in a typical TV tuner. Accordingly, the user may not need to learn new operations in order to select recorded contents. Further, the present system and method may be realized without increasing a hardware device cost.

In the record content searching/providing system and method in accordance with the present invention, the contents are classified in accordance with the virtual channels to be used, and not classified into a layer-like structure. Accordingly, the system and method of the present invention enable to prevent a case such that the user could not find a desired content because of the too complicated layer and classification structure.

In the record content searching/providing system and method in accordance with the present invention, the application program may be selected only using operations similar to ones for switching TV channel. Accordingly, new concepts such as the application programs or their activations, that are not used in a conventional TV tuner or an AV apparatus other then the TV tuner, may be accepted naturally by users without much hesitation nor need of learning new operations.

In the record content searching/providing system and method in accordance with the present invention, information regarding programs replayed before the current replaying program and programs scheduled to be replayed after the current replaying program may be superimposed on the display screen when the program is replayed. Accordingly, the user may be clearly informed of which program would be displayed when the move operation along the time axis (for example, by operating left/right move key) is executed.

Having described our invention as related to the embodiments shown in the accompanying drawings, it is our intention that the present invention be not limited by any of the details of description, unless otherwise specified, but rather be construed broadly within its spirit and scope as set out in the accompanying claims.

For example, the present invention may also be applied in the similar way as in the embodiments described above to a system that records pictures besides the broadcasting contents or contents including other than picture data.

What is claimed is:

1. A content reproducing system for displaying a virtual channel and a broadcast channel and for searching for a first content item from a storage device storing a plurality of content items and for providing the first content item to a user, the content reproducing system comprising:

a content classification section configured to classify the content items into a plurality of classifications;

a channel assignment section configured to assign the virtual channel from a plurality of virtual channels to each of the plurality of classifications;

a content arrangement section configured to arrange each of the content items into a replaying sequence on the virtual channel corresponding to the classification of the content item, the content items being scheduled in the replaying sequence based on stored user preferences, wherein a first one of the content items having higher importance to the user than the remaining content items is scheduled immediately after one of the remaining content items being currently replayed by the user;

a user operation receiving section configured to receive a user operation for selecting one of the virtual channels;

a content providing section configured to acquire the first content item from the selected virtual channel in response to the user operation received via the user operation receiving section and provide the first content item for reproduction; and a content reproducing section configured to reproduce the first content item, wherein the user operation receiving section is configured to receive one or more selected user operations and modify the reproduction of the first content item in accordance with the selected user operations;

wherein arranging each of the content items includes recording each of the content items into the virtual channel corresponding to the classification of the content item; and wherein another one of the content items having a lower importance to the user than the remaining content items is scheduled immediately before one of the remaining content items being currently replayed by the user.

2. The content reproducing system according to claim 1, wherein:

the user operation receiving section includes a first command section configured to change a value of a reproduction characteristic operation in a first direction and a second command section configured to change a value of a reproduction characteristic operation in a second direction; and the content providing section specifies one of the virtual channels in accordance with the changing value of the reproduction characteristic in the first direction by the first commanding section, and specifies one of the content items in the virtual channel in accordance with the changing value of the reproduction characteristic in the second direction by the second commanding section.

3. The content reproducing system according to claim 2, wherein:

the first command section and the second command section comprise direction keys.

4. The content reproducing system according to claim 2, wherein when a content item from the virtual channel is being replayed, if the second command section is pressed once, the replayed content item is changed forward to a starting point of a next content item within the virtual channel.

5. The content reproducing system according to claim 2, wherein when a content item from the virtual channel is being replayed, if the second command section is pressed once, the replayed content item is changed backward to a starting point of the replayed content item.

6. The content reproducing system according to claim 5, wherein when the second command section is pressed once more, the replayed content items is further changed to a starting point of a previous content item within the virtual channel.

7. The content reproducing system according to claim 1, wherein:

the user operation receiving section includes a set of numeral keys for specifying a channel number;

the channel assignment section assigns the virtual channels to the numeral keys; and the content providing section acquires content items arranged into virtual channels corresponding to numeral keys specified by the user operation receiving section.

8. The content reproducing system according to claim 1, wherein:

the content arrangement section determines the replaying sequence the content items on the virtual channels in accordance with profile information inputted by a user; and at least one of the virtual channels is assigned to the user, the user being one of a plurality of users having assigned virtual channels.

9. The content reproducing system according to claim 1, wherein:

when the selected virtual channel is re-selected after having been previously switched to a second channel at an earlier time, the content providing section provides content items beginning from the earlier time when the virtual channel was switched to the second channel.

10. The content reproducing system according to claim 1, wherein the content arrangement section is configured to:

determine a preferred one of the content items having higher importance than one or more of the remaining content items; and schedule the preferred content item to be replayed at a time when the user is more likely to use the content reproducing system to view the preferred content item, wherein the preferred content item is assigned to the virtual channel corresponding to the classification of the content item based on an instruction received from the user.

11. The content reproducing system according to claim 1, wherein the content arrangement section is configured to automatically generate a new virtual channel including content items identified by the stored user preferences.

12. The content reproducing system according to claim 1, wherein a time axis of the broadcast channel is different from a time axis of the virtual channel.

13. The content reproducing system according to claim 1, wherein one of the plurality of content items includes an application.

14. A non-transitory computer-readable storage medium including instructions operable to cause a computer to perform a method for displaying a virtual channel and a broadcast channel and for searching for a first content item from a storage device storing a plurality of content items and for providing the first content item to a user, the method comprising:

classifying the content items into a plurality of classifications;

assigning the virtual channel from a plurality of virtual channels to each of the plurality of classifications;

arranging each of the content items into a replaying sequence on the virtual channel corresponding to the classification of the content item, the content items being scheduled in the replaying sequence based on stored user preferences, wherein a first one of the content items having higher importance to the user than the remaining content items is scheduled immediately after one of the remaining content items being currently replayed by the user;

receiving a user operation for selecting one of the virtual channels;

acquiring the first content item from the selected virtual channel in response to the user operation received via the user operation receiving section and provide the first content item for reproduction; and reproducing the first content item, wherein reproducing the first content item comprises receiving one or more selected user operations and modifying the reproduction of the first content item in accordance with the selected user operations;

wherein arranging each of the content items includes recording each of the content items into the virtual channel corresponding to the classification of the content item; and wherein another one of the content items having a lower importance to the user than the remaining content items is scheduled immediately before one of the remaining content items being currently replayed by the user.

15. The storage medium according to claim 14, the method further comprising automatically generating a new virtual channel including content items identified by the stored user preferences.

16. A method for displaying a virtual channel and a broadcast channel and for searching for a first content item from a storage device storing a plurality of content items and for providing the first content item to a user, the method comprising the steps performed by a computer of:

classifying the content items into a plurality of classifications;

assigning the virtual channel from a plurality of virtual channels to each of the plurality of classifications;

arranging each of the content items into a replaying sequence on the virtual channel corresponding to the classification of the content item, the content items being scheduled in the replaying sequence based on stored user preferences, wherein a first one of the content items having higher importance to the user than the remaining content items is scheduled immediately after one of the remaining content items being currently replayed by the user;

receiving a user operation for selecting one of the virtual channels;

acquiring the first content item from the selected virtual channel in response to the user operation received via the user operation receiving section and provide the first content item for reproduction; and reproducing the first content item, wherein reproducing the first content item comprises receiving one or more selected user operations and modifying the reproduction of the first content item in accordance with the selected user operations;

wherein arranging each of the content items includes recording each of the content items into the virtual channel corresponding to the classification of the content item; and wherein another one of the content items having a lower importance to the user than the remaining content items is scheduled immediately before one of the remaining content items being currently replayed by the user.

17. The method according to claim 16, the method further comprising automatically generating a new virtual channel including content items identified by the stored user preferences.

* * * * *